(12) United States Patent
Rikimaru et al.

(10) Patent No.: US 8,057,234 B2
(45) Date of Patent: Nov. 15, 2011

(54) FOREIGN LANGUAGE LEARNING APPARATUS

(75) Inventors: Hiroshi Rikimaru, Kyoto (JP); Shinichi Sakamoto, Tokyo (JP); Takeshi Nakaichi, Tokyo (JP)

(73) Assignee: Hiroshi Rikimaru, Kyoto (JP)

( * ) Notice: Subject to any disclaimer, the term of this patent is extended or adjusted under 35 U.S.C. 154(b) by 1582 days.

(21) Appl. No.: 11/411,758

(22) Filed: Apr. 27, 2006

(65) Prior Publication Data

US 2007/0009864 A1    Jan. 11, 2007

(30) Foreign Application Priority Data

Jul. 6, 2005    (JP) ................................. 2005-197209

(51) Int. Cl.
*G09B 19/04*    (2006.01)
(52) U.S. Cl. .................... 434/185; 434/156; 434/157
(58) Field of Classification Search .......... 434/156–157, 434/167, 185
See application file for complete search history.

(56) References Cited

U.S. PATENT DOCUMENTS

| | | | | |
|---|---|---|---|---|
| 5,303,327 A | * | 4/1994 | Sturner et al. | 704/270 |
| 6,109,107 A | * | 8/2000 | Wright et al. | 73/585 |
| 7,729,907 B2 | | 6/2010 | Rikimaru | |
| 2007/0003083 A1 | * | 1/2007 | Rikimaru | 381/312 |

FOREIGN PATENT DOCUMENTS

JP    2004-135068    4/2004

OTHER PUBLICATIONS

Shannon et al., "Speech Recognition with Primarily Temporal Cues," Science, vol. 270, pp. 303-304 (Oct. 1995).
Obata et al., "Speech perception based on temporal amplitude change with spectrally degraded synthetic sound," Transactions Technical Committee Psychological Physiological Acoustics, H-99-6, pp. 1-8, Acoustical Society of Japan (Jan. 1999).
Obata et al., "Intelligibility of synthesized Japanese speech sound made of band noise—preliminary study for a speech recognition processor utilizing central audiotry function-," Trans. Tech. Comm. Psychol. Physiol. Acoust., H-2000-3, pp. 1-8, Acoustical Society of Japan (Jan. 2000).
Office Action from Japan Patent Office for application No. 2005-197209 dated Mar. 17, 2011.

* cited by examiner

*Primary Examiner* — Xuan Thai
*Assistant Examiner* — Evan Page
(74) *Attorney, Agent, or Firm* — Rader, Fishman & Grauer PLLC

(57) ABSTRACT

The increasing globalization of the world necessitates further strengthening of foreign language learning policies. The brain's foreign language recognition activity is enhanced and effective foreign language learning is enabled by extracting signals of prescribed bands from a speech signal in a foreign language using a first bandpass filter section having two or more bandpass filters, extracting the envelopes of each frequency band signal using envelope extraction sections having envelope extractors, applying a noise source signal to a second bandpass filter section having two or more bandpass filters and extracting noise signals corresponding to the prescribed bands, multiplying the outputs of the first bandpass filter section and the second bandpass filter section in multiplication sections, summing up the outputs of the multiplication sections in an addition section to produce a Noise-Vocoded Speech Sound signal, and presenting the Noise-Vocoded Speech Sound signals for listening.

17 Claims, 12 Drawing Sheets

| m | {fm} |
|---|---|
| 1 | fd1、fcd1、fbc1、fab1、fa1 |
| 2 | fd2、fcd2、fbc2、fab2、fa2 |
| 3 | fd3、fcd3、fbc3、fab3、fa3 |
| 4 | fd4、fcd4、fbc4、fab4、fa4 |

FIG.9A

| n | {Sn} |
|---|---|
| 1 | Sd1、Sc1、Sb1、Sa1 |
| 2 | Sd2、Sc2、Sb2、Sa2 |
| 3 | Sd3、Sc3、Sb3、Sa3 |
| 4 | Sd4、Sc4、Sb4、Sa4 |

FIG.9B

| CI | (m, n) |
|---|---|
| $0\% \leqq CI \leqq 25\%$ | 1、1 |
| $25\% < CI \leqq 50\%$ | 2、2 |
| $50\% < CI \leqq 75\%$ | 3、3 |
| $75\% < CI \leqq 100\%$ | 4、4 |

FIG.9C

FOREIGN LANGUAGE LEARNING APPARATUS

BACKGROUND OF THE INVENTION

1. Field of the Invention

The present invention relates to a foreign language learning apparatus, a foreign language learning method, and to a recording medium used for foreign language learning, wherein foreign language learning is carried out by enhancing brain activity through listening to Noise-Vocoded Speech Sound produced by subjecting frequency band signals to noise degradation in at least a portion of a speech signal.

2. Description of Related Art

It is known from past research into speech signal recognition that even if a speech signal is not heard "as is" and components of the speech signal are subjected to noise degradation using a predetermined method, words can still be recognized to a considerable extent. For example, such technology has been described in non-patent document 1, non-patent document 2, and non-patent document 3.

According to the documents, a signal is produced by summing up signals produced by dividing a speech signal into 4 frequency bands (0-600, 600-1500, 1500-2500, and 2500-4000 Hz), obtaining amplitude envelopes for each frequency band by subjecting the respective speech signals to half-wave rectification and low-pass filtering at 16 Hz, and overlaying the envelopes on band noise corresponding to each frequency band. Such a signal is called Noise-Vocoded Speech Sound signal. An intelligibility of about 80% has been reported when presenting normal-hearing subjects with Noise-Vocoded Speech Sound.

[Non-patent document 1] Shannon, R. V., et al.: "Speech Recognition with Primarily Temporal Cues", *Science*, Vol. 270, pp. 303-304 (1995)

[Non-patent document 2] Yoshihisa Obata, Hiroshi Riquimaroux: Speech perception based on temporal amplitude change with spectrally degraded synthetic sound, *Materials of the Auditory Research Forum of The Acoustical Society of Japan*, H-99-6 (1999).

[Non-patent document 3] Yoshihisa Obata, Hiroshi Riquimaroux: Intelligibility of synthesized Japanese speech sound made of band noise—preliminary study for a speech recognition processor utilizing central auditory function, *Materials of the Auditory Research Forum of The Acoustical Society of Japan*, H-2000-3 (2000).

SUMMARY OF THE INVENTION

In recent years, further strengthening of foreign language learning policies has become necessary in the wake of the increasing globalization in the world.

To solve the problem, the following means and procedures have been adopted in the inventive foreign language learning apparatus, foreign language learning method, and recording medium for foreign language learning.

The foreign language learning apparatus of a first invention herein is a foreign language learning apparatus comprising a Noise-Vocoded Speech Sound generation section generating a Noise-Vocoded Speech Sound signal obtained by dividing at least a portion of a foreign language speech signal into a frequency band signal or a plurality of frequency band signals and subjecting part or all of the frequency band signals to noise degradation, and an output section outputting the Noise-Vocoded Speech Sound signal.

Such an arrangement activates regions other than the regions typically used for speech perception and production in the mother tongue in the brain of the learner, forms a new neural network for the foreign language, and raises the efficiency of foreign language learning.

The foreign language learning apparatus of a second invention herein is a foreign language learning apparatus comprising a speech source signal section outputting a speech signal in a foreign language, a Noise-Vocoded Speech Sound generation section generating a Noise-Vocoded Speech Sound signal obtained by dividing at least a portion of the speech signal into a plurality of frequency band signals and subjecting part or all of the frequency band signals to noise degradation, a control section adjusting the difficulty of aural perception of the speech signal according to the learner's response results, and an output section outputting the Noise-Vocoded Speech Sound signal.

Such an arrangement activates regions other than the regions typically used for speech perception and production in the mother tongue in the brain of the learner, forms a new neural network for the foreign language on a more extensive basis, and raises the efficiency of foreign language learning.

The foreign language learning apparatus of a third invention herein is a foreign language learning apparatus comprising a speech source signal section storing a plurality of speech signals in a foreign language of varying difficulty of aural perception, a Noise-Vocoded Speech Sound generation section generating a Noise-Vocoded Speech Sound signal obtained by dividing at least a portion of a speech signal into a plurality of frequency band signals and subjecting part or all of the frequency band signals to noise degradation, a control section adjusting the difficulty of aural perception according to the learner's response results by selecting speech signals from the plurality of speech signals and supplying them to the Noise-Vocoded Speech Sound generation section, and an output section outputting the Noise-Vocoded Speech Sound signal.

Such an arrangement activates regions other than the regions typically used for speech perception and production in the mother tongue in the brain of the learner, forms a new neural network for the foreign language on a more extensive basis, and raises the efficiency of foreign language learning.

The foreign language learning apparatus of a fourth invention herein is a foreign language learning apparatus comprising a speech source signal section outputting a speech signal in a foreign language, a Noise-Vocoded Speech Sound generation section generating a Noise-Vocoded Speech Sound signal obtained by dividing at least a portion of the speech signal into a plurality of frequency band signals and subjecting part or all of the frequency band signals to noise degradation, a control section adjusting the number of frequency bands and band boundary frequencies in the Noise-Vocoded Speech Sound generation section according to the learner's response results, and an output section outputting the Noise-Vocoded Speech Sound signal.

Such an arrangement activates regions other than the regions typically used for speech perception and production in the mother tongue in the brain of the learner, forms a new neural network for the foreign language on a more extensive basis, and raises the efficiency of foreign language learning.

The foreign language learning apparatus of a fifth invention herein is a foreign language learning apparatus wherein, following an increase in the learner's correct response percentage, the band boundary frequencies and/or the number of frequency bands of the Noise-Vocoded Speech Sound signal are adjusted and training is conducted until the Noise-Vocoded Speech Sound signal reverts to the speech signal.

Such an arrangement activates regions other than the regions typically used for speech perception and production in the mother tongue in the brain of the learner, forms a new neural network for the foreign language on a more extensive basis, and raises the efficiency of foreign language learning.

The foreign language learning apparatus of a sixth invention herein is a foreign language learning apparatus which, instead of the speech source signal section and the Noise-Vocoded Speech Sound generation section, comprises a speech source signal section storing a Noise-Vocoded Speech Sound signal, with the Noise-Vocoded Speech Sound signal read from the speech source signal section and supplied to the output section, or a foreign language learning apparatus comprising a speech source signal section storing a plurality of Noise-Vocoded Speech Sound signals obtained by adjusting the degree of difficulty of aural perception of the speech signal, or a plurality of Noise-Vocoded Speech Sound signals obtained by adjusting the frequency bands and/or the number of frequency bands, the Noise-Vocoded Speech Sound signals being produced by dividing at least a portion of a foreign language speech signal into a plurality of frequency band signals and subjecting part or all of the frequency band signals to noise degradation, a control section selecting and reading out the Noise-Vocoded Speech Sound signals from the speech source signal section according to the learner's response results, and an output section outputting the Noise-Vocoded Speech Sound signals.

Such an arrangement provides for numerous speech sources optimally suited for forming new neural networks for the foreign language on a more extensive basis and raises the efficiency of foreign language learning.

Because the foreign language learning method utilized in the foreign language learning apparatus can be implemented as a procedure, such as a computer program, it may be used as a software program for operating a computer or as a software program recording medium, on which a program used for operating a computer is recorded. In addition, when used in the form of a recording medium, on which foreign language speech signals and Noise-Vocoded Speech Sound signals are recorded, it can be utilized as a teaching tool for foreign language learning.

According to the present invention, the foreign language learning apparatus, the foreign language learning method, and the recording medium and software program for foreign language learning, wherein normal speech in a foreign language is converted to Noise-Vocoded Speech Sound and presented for listening, stimulate brain activation and enable efficient foreign language learning by enhancing brain functions and improving language comprehension.

BRIEF DESCRIPTION OF THE DRAWINGS

FIGS. 9A to 9C are diagrams illustrating data tables and correspondence tables used in an embodiment of the present invention.

DETAILED DESCRIPTION OF THE INVENTION

Below, embodiments of the foreign language learning apparatus etc. are explained by referring to drawings. It should be noted that duplicate explanations have been omitted in some cases because components assigned the same numerals in the embodiments perform similar operations.

Embodiment 1

Figure 1:
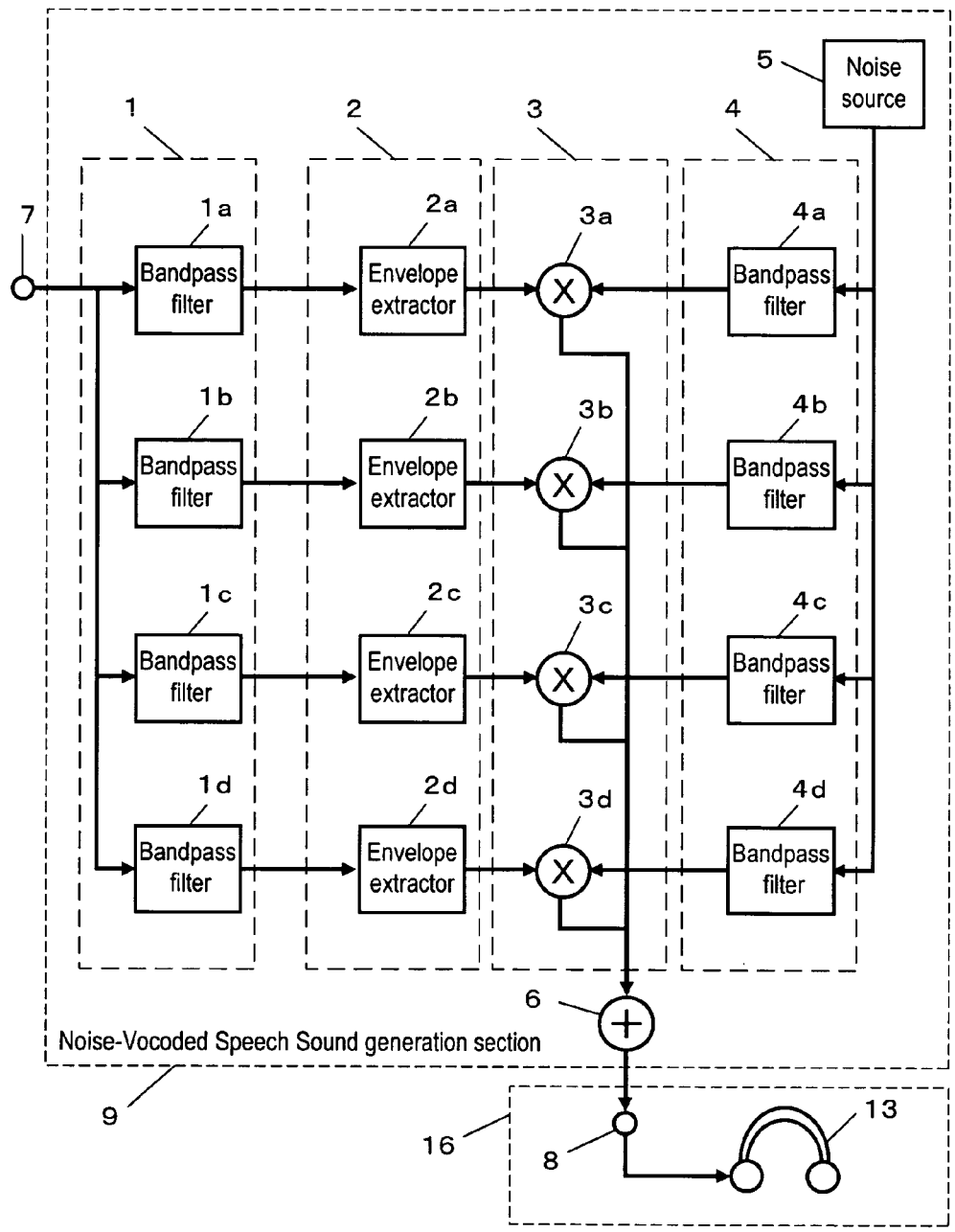
FIG. 1 is a block diagram of a foreign language learning apparatus according to an embodiment of the present invention.

FIG. 1 is a block diagram of the foreign language learning apparatus of the present invention. In FIG. 1, an input speech signal in a foreign language recorded through a microphone is supplied to a Noise-Vocoded Speech Sound generation section 9 via an input terminal 7. The Noise-Vocoded Speech Sound generation section 9 generates a Noise-Vocoded Speech Sound signal, described below, and supplies it to an output section 16. The output section 16 supplies the Noise-Vocoded Speech Sound signal to headphones 13 through an output terminal 8, converting the Noise-Vocoded Speech Sound signal into sound. The learner studies the foreign language by listening to the Noise-Vocoded Speech Sound signal through the headphones 13. The Noise-Vocoded Speech Sound generation section 9 has a bandpass filter section 1, an envelope extraction section 2, a multiplication section 3, a bandpass filter section 4, a noise source 5, and an addition section 6. The input speech signal is applied to the bandpass filter section 1 via the input terminal 7. The bandpass filter section 1, has a plurality of bandpass filters 1a, 1b, 1c, and 1d, which extract signals of predetermined bands, and divides the speech signal into a plurality of frequency band signals. The output signals of the bandpass filters 1a, 1b, 1c, and 1d are applied, respectively, to the envelope extractors 2a, 2b, 2c, and 2d of the envelope extraction section 2 in order to extract the envelopes of the frequency band signals. The noise signal outputted by the noise source 5 is applied to the bandpass filter section 4, which has a plurality of bandpass filters 4a, 4b, 4c, and 4d, and is divided into band noise signals of the same frequency bands as the bandpass filter section 1. In the multiplication section 3, which has multipliers 3a, 3b, 3c, and 3d, the outputs of the envelope extractors 2a, 2b, 2c, and 2d and those of the bandpass filters 4a, 4b, 4c, and 4d are multiplied together for each corresponding band, with the multiplication results added up in the addition section 6 and appearing as an output signal at the output terminal 8. It should be noted that the bandpass filters possess the well-known function of extracting predetermined frequency components from a signal and can be composed of analog circuits, digital circuits, digital signal processors, etc. Furthermore, the envelope extractors possess the well-known function of detecting variation in the amplitude value of a signal and can be composed of analog circuits, digital circuits, digital signal processors, etc. based on the principles of half-wave rectification and full-wave rectification. Moreover, in the bandpass filter sections 1 and 4, high pass filters may be used for the bandpass filters 1*a* and 4*a*, which process the highest bands, thereby including high pass filters. Low pass filters may be used as the bandpass filters 1*d* and 4*d*, which process the lowest bands, thereby including low pass filters as well. It should be noted that speakers may be used instead of the headphones 13 in the output section 16. Moreover, needless to say, when the output terminal 8 supplies a Noise-Vocoded Speech Sound signal to the headphones 13, digital sample information on the Noise-Vocoded Speech Sound signal is supplied upon conversion to an analog signal by a digital-to-analog converter and a power amplifier, not shown. Moreover, a digital-to-analog converter, a power amplifier, headphones 13, or speakers may be interchangeably used in the output section 16 as auxiliary components for the foreign language learning apparatus of the present invention.

Figure 2:
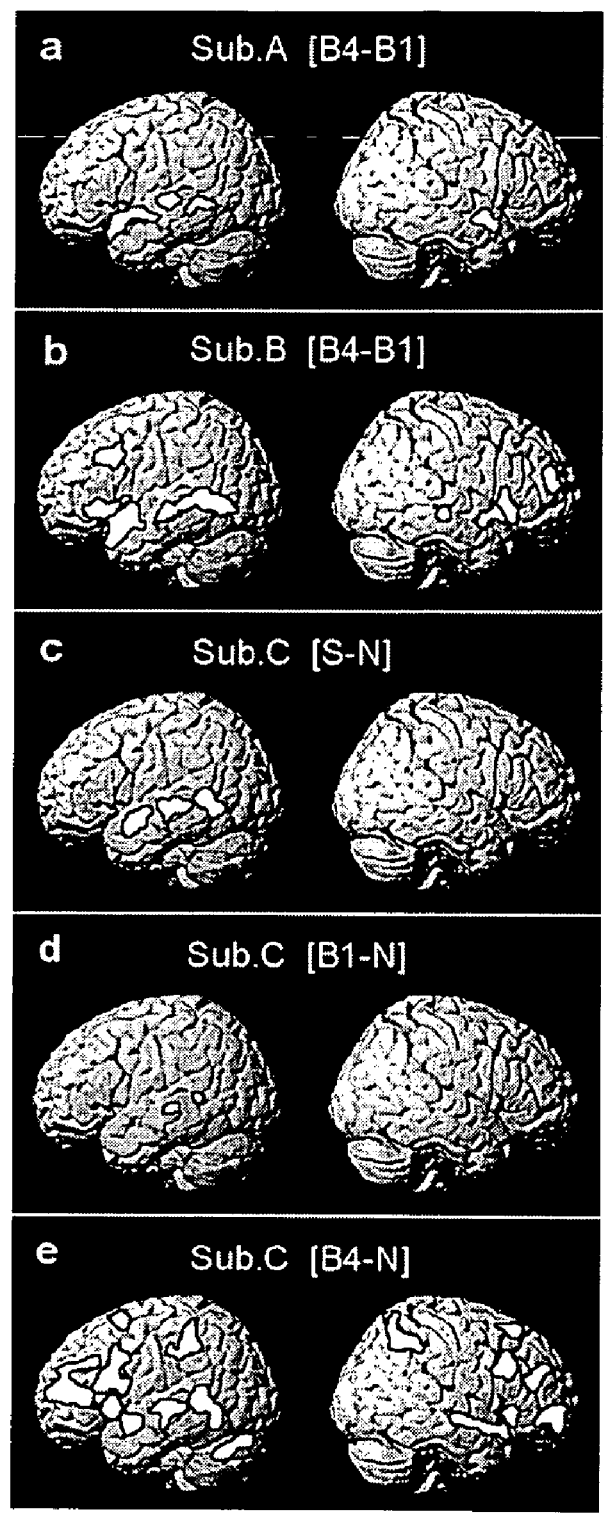
FIG. 2 is a diagram illustrating an example of observed brain activity enhancement associated with Noise-Vocoded Speech Sound.

It has been found that presenting the thus produced Noise-Vocoded Speech Sound in a foreign language for listening through earphones results in the activation of various regions other than the regions typically activated during aural recognition in the brain. When the activated brain regions are examined using an MRI device while presenting the above-described four-band Noise-Vocoded Speech Sound for listening, activation is observed in the regions of the left temporal lobe that are believed to be used for regular voice recognition. Also, in addition to that, activation is observed in regions believed to be related to functions other than speech recognition, such as the right temporal lobe, the frontal lobe, the parietal lobe, the right side of the cerebellum, etc. FIG. 2 illustrates the results of observation of brain activation using a functional MRI device. The regions shown in white are the regions, in which above-baseline activation was observed. In the figure, Sub.A, Sub.B, and Sub.C indicate subjects. B4, B1, N, and S are the presented stimuli, which are, respectively, as follows. B4 was produced by dividing speech material into four frequency bands using band-pass filters, extracting the respective amplitude envelopes, setting the band boundary frequencies to 600, 1500, and 2100 Hz, and overlaying the amplitude envelopes on narrowband noise of the corresponding frequency bands. B1 was obtained by extracting the amplitude envelope for all the frequency bands and overlaying it on the noise. However, in such noise, the effective values of the speech material, divided using the band boundary frequencies, are applied to the corresponding bands in advance. S represents speech material used "as is". N represents an approximation of the power spectrum to B4 using the same method as in the case of B1, but without imposing the amplitude envelopes. Speech material was obtained by recording simple sentences consisting of 12 to 16 moras (2 to 3 seconds) using a sampling frequency of 8000 Hz and a quantization accuracy of 16 bits. In addition, low frequency noise (40 Hz or less) in the material was reduced using a high-pass filter. [B4-B1] in FIG. 2 illustrates the difference in the activity of stimulus B4 and stimulus B1. The activated regions in the left temporal lobe observed in [S-N] (FIG. 2*c*) are believed to be the regions used for regular speech recognition. The same regions as in [S-N] are activated in [B4-B1] (FIG. 2*a,b*) and in [B4-N] (FIG. 2*e*). Moreover, in addition to that, activation can be seen in the right temporal lobe as well. In addition, activation can be seen on both sides of the frontal lobe in Sub.B, and on both sides of the frontal lobe and parietal lobe, as well as on the right side of the cerebellum in Sub.C. Based on this, it is reasonable to believe that, during listening to B4, speech recognition is carried out using other ancillary processing means in addition to regular speech recognition processing. Moreover, considerable cross-subject variation is observed in terms of activation patterns other than those of the temporal lobes, and it is believed that there are individual differences in the activation of regions other than the regular speech recognition regions. Therefore, there is a chance that regions may be activated that were not expected to be artificially activated in the past.

Because the activation of brain activity maintains and enhances the functions of its regions, quite naturally, it can enhance the functions of the regions responsible for aural recognition and, in addition, functional enhancement is possible for various regions other than the regions responsible for aural recognition, such as, for instance, regions responsible for language recognition, and one can expect effects in terms of foreign language learning as well. Usually, it is not easy for an ordinary person to selectively activate a specific region of the brain. In addition, there are regions that cannot be activated without special mental activities and training. In accordance with the present invention, various brain regions can be activated subconsciously and activation can be achieved in regions where activation by other methods presents difficulties, as a result of which, based on functional enhancement of auditory acuity and enhancement of the ability to recognize aurally perceived content, the invention is effective in foreign language learning. For instance, when training begins with a drastically reduced number of bands, normally used frequency information cannot be utilized and the brain attempts to perceive and discriminate speech without the frequency information. At such time, a substitutive (compensatory) mechanism starts operating in the brain if there is anything that may be usable, albeit not normally used. However, such operation creates a need to utilize brain regions that are not normally used, thereby establishing a new neural network. In other words, it is believed that regions other than the regions typically used for speech perception and production in the mother tongue in the brain are activated through the use of the Noise-Vocoded Speech Sound, thereby forming a new neural network for the foreign language. In the process, distinctions, which could not be discriminated before when listening to regular speech, start being discriminated, and, in the course of discrimination, the learner acquires the ability for genuine correct pronunciation in the foreign language. As a result, the ability to discriminate the foreign language increases, and speech production skills improve as well. Therefore, effects can be expected not only in terms of hearing, but in terms of speaking as well.

As explained above, the band noise signals outputted by the bandpass filter section 4 were produced by a noise source 5. However, this can also be achieved by subjecting a speech signal to distortion and noise degradation. Instead of the output signal of the noise source 5, the input signal of the bandpass filter section 1 may be subjected to distortion and supplied as a noise signal to the bandpass filters 4*a* to 4*d*; otherwise, the output signals of the bandpass filters 1*a* to 1*d* may be distorted and supplied as a noise signal to the multipliers 3*a* to 3*d*.

In FIG. 1, the respective envelopes of the speech signals in four different frequency bands were detected and the amplitude of the corresponding band noise signals was modulated in accordance with the envelope signals; however, it is also possible to use only some of the envelope signals. As for the rate, with which the envelope signals change over time, it is possible to use envelope signals that follow the speech variations closely or signals that change more slowly. That is, it is possible to use the time-series mean of the envelope signal for each frequency band. In addition, an envelope signal obtained from all the frequency bands can be used as well. Although the brain activation effects may be somewhat weaker, activation can also be achieved in regions other than the aural recognition and speech recognition regions.

Although in FIG. 1 all the speech signals belonging to the four frequency bands were replaced with band noise signals, residual speech signal components may be allowed by applying the speech signals from some of the frequency bands to the addition section 6 directly, without applying them to the multiplication section 3. For a beginner who starts learning a foreign language, the number of the frequency bands with residual speech signal components may be increased. In addition, as the process of foreign language learning progresses, the frequency bands with residual speech signal components may be subject to various changes.

The different units of the foreign language apparatus of the present invention may be realized using analog circuit-based bandpass circuits, envelope detector circuits, multiplication circuits, noise signal generation circuits, etc. In addition, these circuit functions can be implemented using digital signal processors (DSP).

It should be noted that the microphone and the input terminal 7 can be considered as units of the speech source signal section outputting a speech signal in a foreign language to the Noise-Vocoded Speech Sound generation section 9.

According to the present embodiment, as described above, there is provided a foreign language learning apparatus, in which the learner is presented with a Noise-Vocoded Speech Sound signal obtained by dividing at least a portion of an input speech signal into one or a plurality of frequency band signals and subjecting them to noise degradation. The use of the foreign language learning apparatus promotes brain activation, and effects are expected in terms of foreign language learning.

It should be noted that the apparatus can be used by foreigners for learning Japanese because the band boundary frequencies are set to 600, 1500, and 2100 Hz, which is close to the frequencies corresponding to the boundaries between the formants of Japanese vowels.

Embodiment 2

Figure 3:
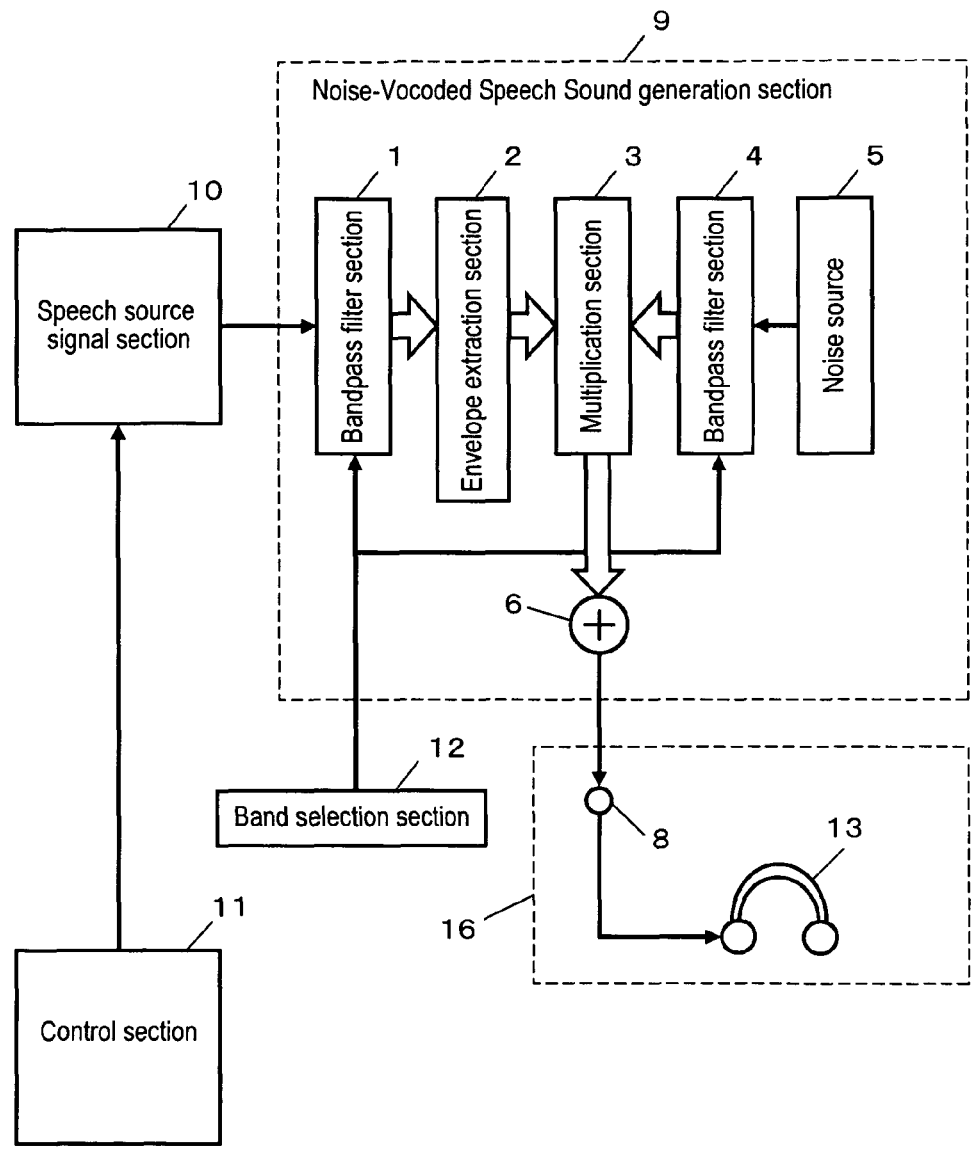
FIG. 3 is a block diagram of another foreign language learning apparatus according to an embodiment of the present invention.

FIG. 3 is a block diagram of a foreign language learning apparatus according to another embodiment of the present invention based on the use of Noise-Vocoded Speech Sound. In FIG. 3, in the same manner as in FIG. 1, the Noise-Vocoded Speech Sound generation section 9 is made up of a bandpass filter section 1, an envelope extraction section 2, a multiplication section 3, a bandpass filter section 4, a noise source 5, and an addition section 6. A speech signal made up of words and sentences in a foreign language is stored in the speech source signal section 10. The stored speech signal may be in the form of digital sample data obtained from foreign language speech waveforms or in the form of digital data produced by speech compression. It should be noted that it may be present in other forms as well. The speech source signal section 10 reads the stored speech signal and supplies it to the Noise-Vocoded Speech Sound generation section 9. The speech signal supplied by the speech source signal section 10 is in the digital sample form described above. When the speech source signal section 10 reads the compressed speech digital data, it decompresses the data and supplies the speech signal in digital sample form to the Noise-Vocoded Speech Sound generation section 9. The control section 11, which has built-in operative means performing selection, applies a control signal or control information to the speech source signal section 10 in order to select and specify a task, in which a speech signal with predetermined words and sentences is used. The operative means may be constituted by a button switch, keyboard entry means, etc. The speech source signal section 10 supplies the speech signal made up of the specified words and sentences to the bandpass filter section 1 of the Noise-Vocoded Speech Sound generation section 9. A Noise-Vocoded Speech Sound signal made up of these words and sentences is obtained from the output terminal 8. It is presented to the learner for listening through the headphones 13 of the output section 16. It should be noted that speakers can also be used in the output section 16. The instructor operates the operative means of the control section 11 in accordance with the instructional process of foreign language learning, successively presenting words and sentences for listening, and the learners, upon listening to the Noise-Vocoded Speech Sound, orally convey the recognized words and sentences to the instructor who, upon evaluation of the correctness of their responses, informs the learners of the results and moves on to the next step. The learner's learning is based on information on correct and wrong responses. Depending on the correctness of the response, the instructor selects the subsequent words and sentences.

The standard frequency bands for the bandpass filters of the bandpass filter sections 1 and 4 are 0-600 Hz, 600-1500 Hz, 1500-2500 Hz, and 2500-4000 Hz. The band selection section 12 can switch the band boundary frequencies and/or the number of bands of the bandpass filter sections 1 and 4. To this end, sets of information objects indicating the number of bands and band boundary frequencies are stored in the band selection section 12, and selection of information from the sets of information objects can be performed using operative means, such as button switches or keyboard input means, etc. For instance, the number of frequency bands can be selected from 1, 2, 3, or 4. This is because, depending on the language, for example, for vowels, consonants, plosives, etc., there may be cases in which there is no need to have four frequency bands. For instance, by setting the output of the bandpass filters 1c, 1d, 4c, and 4d to zero, the number of frequency bands can be set to 2. Moreover, the band boundary frequencies between the frequency bands for all or some of the bandpass filters can be switched and set to frequencies other than 600 Hz, 1500 Hz, 2500 Hz, and 4000 Hz. The values of 600 Hz, 1500 Hz, 2500 Hz, and 4000 Hz are close to the standard frequency boundaries separating vowels in speech, /a/, /i/, /u/, /e/, and /o/ in Japanese language at the first and second formant. These frequency boundaries can be used for learning Japanese as a foreign language. However, sometimes these frequency boundaries may vary depending on the person. Because the efficiency of foreign language learning is expected to improve if the boundaries between the frequency bands are corrected and adjusted in accordance with such individual differences, the frequency boundaries are switchable through the band selection section 12. In addition, since the vowel system of a foreign language may be different from that of Japanese, the number of bandpass filters and the number of band boundary frequencies can be made switchable so as to match the foreign language.

To accommodate a foreign language, an automatic language recognition section may be provided to automatically recognize the words and sentences initially inputted by the learner and the instructor through the microphone. The automatic language recognition section supplies country name data to the band selection section 12, with the band selection section 12 setting the number of bandpass filters and the band boundary frequencies in the bandpass filter sections 1 and 4 in accordance with the language of the specified country.

It should be noted that the selection and switching of the bandpass filter number and frequency band boundaries, as well as the selection and switching of the bandpass filter number and frequency band boundaries based on automatic language recognition, as described above is also applicable to the foreign language learning apparatus described in Embodiment 1.

As mentioned above, the effects of the above-described foreign language learning apparatus, such as that of the present embodiment, consist in the enhancement of brain activity involved in foreign language recognition.

It should be noted that the speech source signal section 10 can be implemented using a semiconductor memory, hard disk memory, and other storage means. The control section 11 may be constituted by a piece of special-purpose hardware or can be implemented in a CPU or another program execution section reading and executing a software program recorded on a hard disk, semiconductor memory, or another storage medium. Input means, such as a switch for selecting words and sentences, can be provided in the control section 11.

Embodiment 3

Figure 4:
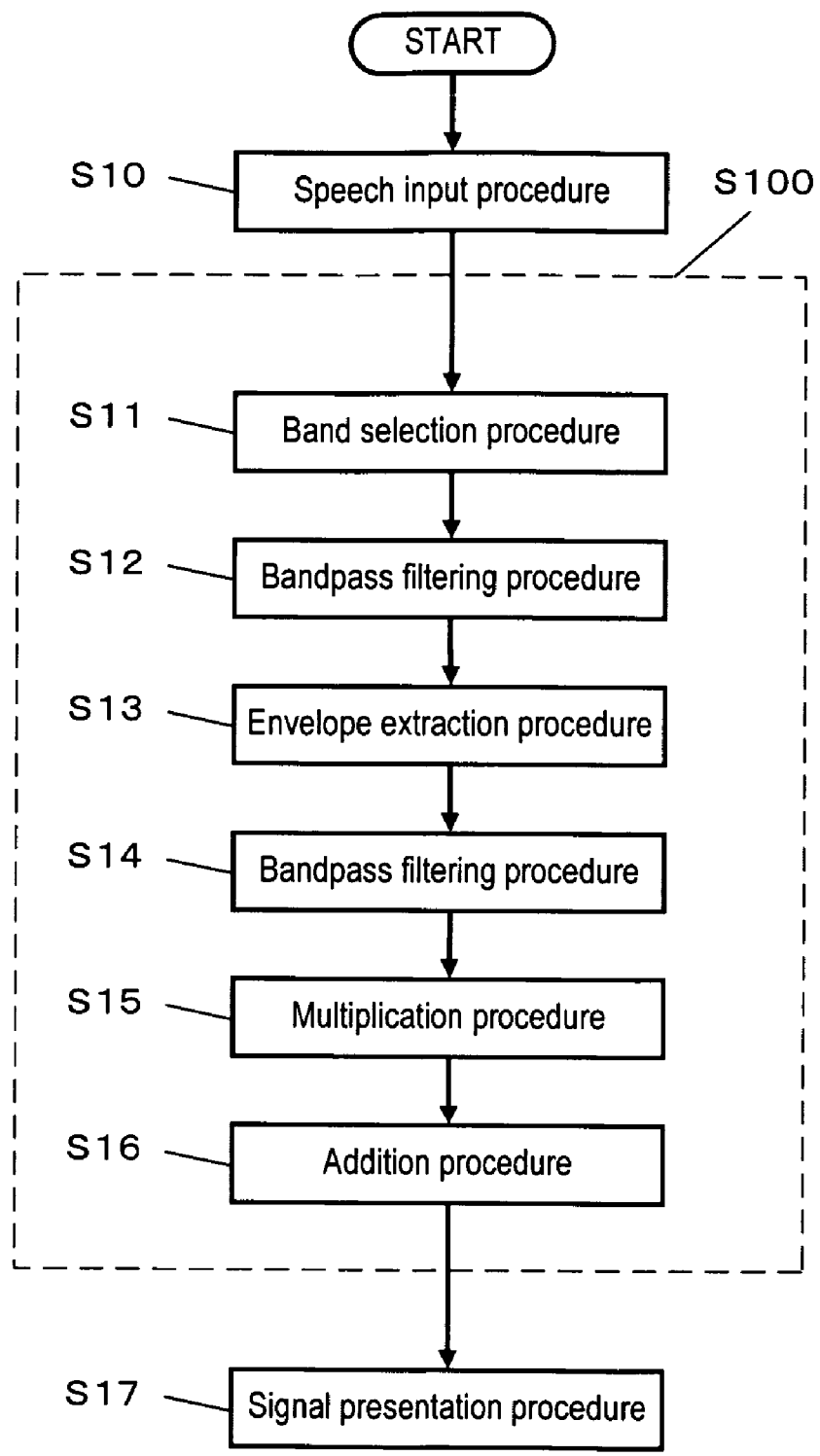
FIG. 4 is a flow chart illustrating the operation of a foreign language learning apparatus according to an embodiment of the present invention.

Embodiments of the foreign language learning method of the present invention are explained below. FIG. 4 is an example of a flow chart illustrating a method used for implementing the functionality of the foreign language learning apparatus of the present invention.

The steps described below are executed in a regular manner in synchronization with the period corresponding to the sampling frequency, at which the speech data are generated. During the speech input procedure (Step S10), an input speech signal obtained through the microphone of the foreign language learning apparatus is subjected to A/D conversion, with the speech data then passed on to the bandpass filtering procedure (Step S12). Then, if necessary, the band boundary frequencies and the number of band pass frequencies used in the subsequent bandpass filtering procedures (Step S12) and (Step S14) are adjusted and set during a band selection procedure (Step S11). This procedure is carried out if the learner operates the band selection section 12. If the learner does not operate it, the procedure is skipped. Next, during the bandpass filtering procedure (Step S12), the speech data is filtered based on the preset number of bandpass frequencies and the band boundary frequencies. During the envelope extraction procedure (Step S13), envelope component data is extracted from the filtered speech data. Next, during a bandpass filtering procedure (Step S14), a noise signal consisting of white noise is filtered using the preset number of band pass frequencies and the band boundary frequencies, producing band noise signal data. The envelope component data and band noise signal data are multiplied together in the subsequent multiplication procedure (Step S15), and, if there are multiplication results for a plurality of bands, summed up in an addition procedure (Step S16). The summed speech data constitute Noise-Vocoded Speech Sound data. During the signal presentation procedure (Step S17), it is subjected to D/A conversion and presented to the learner for listening through the earphones as an analog speech signal.

The procedures of (Step S10) to (Step S17) may be executed sequentially, as shown in FIG. 4, or carried out in parallel. These procedures can be implemented in the form of a software program for a digital signal processor (DSP). The bandpass filtering procedures can be implemented using well-known arithmetic processing programs used for digital filtering. For the envelope extraction procedure, it is sufficient to subject the bandpass-filtered speech data to half-wave rectification and low-pass filtering to remove high-frequency fluctuations. In addition, the bandpass-filtered speech data may be half-wave rectified, with the peak values of the output waveform data used as envelope data. Detailed explanations are omitted herein because various types of such digital waveform processing are well-known in software programs for digital signal processors (DSP). Moreover, processing performed by digital signal processors (DSP) can be implemented using MPU and semiconductor memory-based computer systems as well as software programs stored in memory.

In addition, the procedures of (Step S11) to (Step S16) constitute a Noise-Vocoded Speech Sound production procedure (Step S100). It should be noted that (Step S100) is called "noise vocoding procedure" or "first step" in the explanations below.

In the band selection procedure (Step S11), band boundary frequencies and the number of frequency bands appropriate for the recognized language can be selected by providing an automatic language recognition procedure for Japanese, English, German, Chinese, etc. The technology of automatic language recognition is well-known, and detailed explanations are omitted herein.

Embodiment 4

Figure 5:
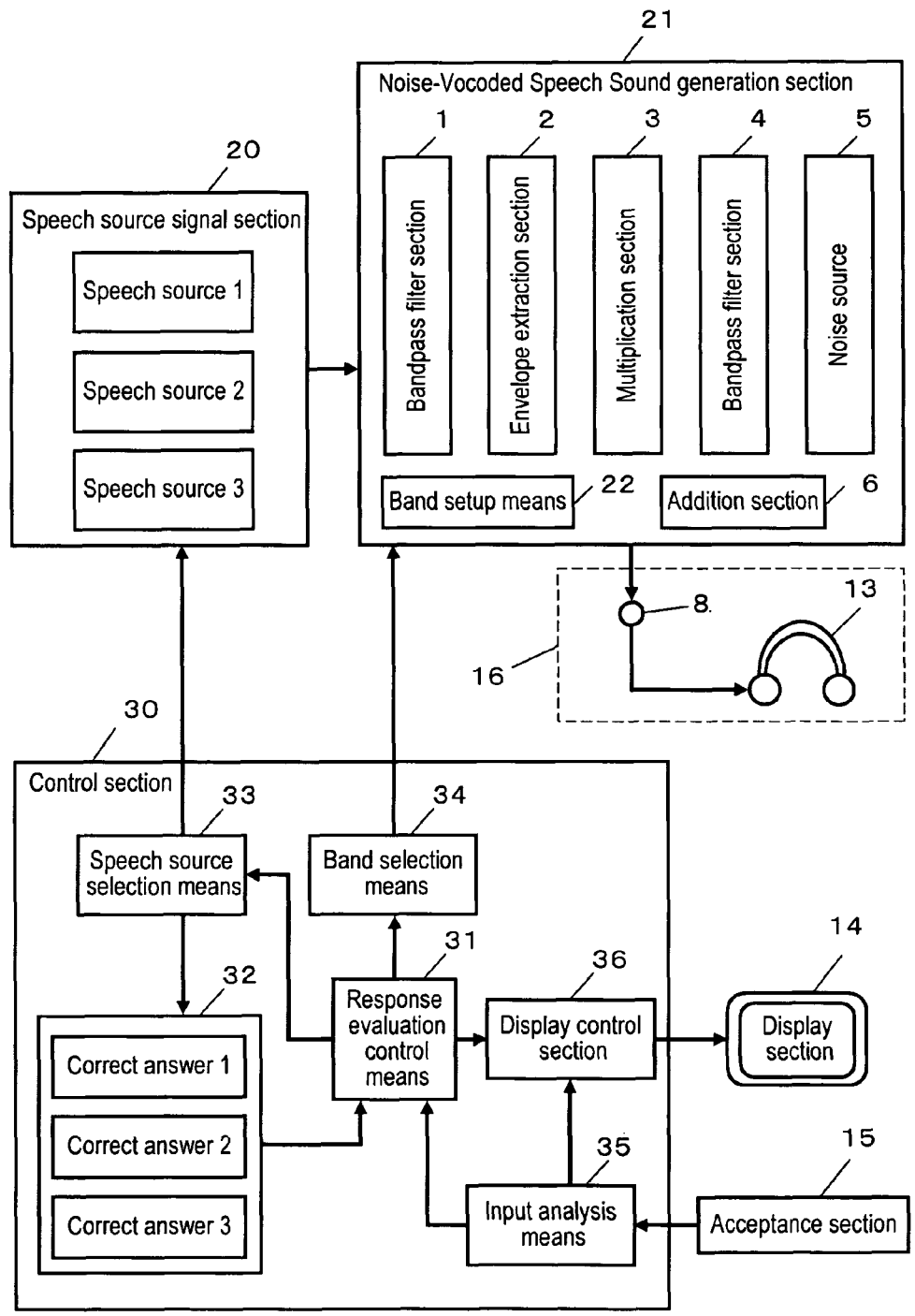
FIG. 5 is a block diagram of yet another foreign language learning apparatus according to an embodiment of the present invention.

FIG. 5 is a block diagram of the foreign language learning apparatus of the present invention wherein the effectiveness of learning is improved by presenting to the learner Noise-Vocoded Speech Sound signals obtained by adjusting the difficulty of aural perception of the speech signal tasks, as well as with various Noise-Vocoded Speech Sound signals obtained by adjusting the number of frequency bands and the band boundary frequencies of the Noise-Vocoded Speech Sound signal as foreign language learning progresses. The term difficulty of aural perception means whether it is easy or difficult to understand a speech signal when presented with a speech signal outputted by the speech source signal section 20. The difficulty of aural perception varies when the sentences and words constituting the foreign language speech signal vary. The difficulty of aural perception is usually low for simple sentences, short sentences, sentences with simple grammatical structure, short words, etc. When the speed, i.e. the rate of speed, at which words are spoken in the speech signal, is in the medium range, the difficulty of aural perception is lower than in cases, wherein the rate of speed is fast or in cases, wherein the rate of speed is extremely slow. In case of English, female speech is easier to understand and has a lower aural perception difficulty in comparison with male speech. This is believed to be due to the fact that the difficulty of aural perception varies depending on differences in the pitch frequency of the speech signal. In the present embodiment, the effectiveness of learning is increased by changing the aural perception difficulty of the above-described speech signal. Methods used for changing the difficulty of aural perception, as described below, include methods, in which a plurality of speech signals with varying sentences and words, rates of speed of spoken words, pitch frequencies, etc. are stored in advance as a speech source, followed by selection from the plurality of speech signals, and methods, in which the playback speed and playback pitch frequencies of the speech signals are varied. It should be noted that in the explanations below, it is implied that sentences include words, idioms, and other utterances. Conversely, the term utterances includes sentences, words, idioms, etc. As explained above, the concept of adjusting the aural perception difficulty of the speech signal implies both cases, in which adjustments are made by selecting from among different speech signals, and cases, in which adjustments are made to the selected speech signals. Moreover, this also includes cases, in which the speech signals of words and other utterances in a portion of a sentence constituting the speech signal are replaced with the speech signals of words with a different degree of aural difficulty, and the sentence is outputted as the speech signal of a different sentence. Since such utterance substitution methods are well-known as techniques for compilation-based speech synthesis, the explanations are omitted.

As explained above, in the present embodiment, a plurality of speech signals, in which utterances constituting the speech signal, speech signal speech rate, or a single pitch frequency are varied, are stored in advance, selected appropriately, converted to Noise-Vocoded Speech Sound signals, and outputted from the output section 16. Moreover, speech signals of varying degree of difficulty, obtained by adjusting part or all of the utterances constituting the speech signals in the original speech signals, by adjusting the speech production rate of the speech signals in the original speech signals, or by adjusting a single pitch frequency in the original speech signals, are converted to Noise-Vocoded Speech Sound signals and outputted from the output section 16. It should be noted that methods used for varying the level of difficulty are not limited to the above examples.

In FIG. 5, the foreign language learning apparatus of the present invention comprises a speech source signal section 20, a Noise-Vocoded Speech Sound generation section 21, a control section 30, the output section 16, a display section 14, and an acceptance section 15. A plurality of exercises used for foreign language learning, such as words and sample sentences, are stored in the speech source signal section 20 in speech signal form. Speech source 1 to speech source 3 provide speech source signals matching the respective degrees of difficulty, with speech source 1 providing exercises for beginners, speech source 2 providing exercises for intermediate learners, and speech source 3 providing exercises for advanced learners. For instance, each exercise is made up of 10 tasks. The tasks can be individually selected based on a difficulty identifier Di (Di=1 to 3) and a task number Qj (Qj=1 to 10). The speech source signal section 20 supplies the speech signals of the tasks to the Noise-Vocoded Speech Sound generation section 21.

While being basically the same as the configuration for generating Noise-Vocoded Speech Sound described in FIG. 1, the configuration of the Noise-Vocoded Speech Sound generation section 21 permits adjustments to be made to the band boundary frequencies and the number of frequency bands. To this end, switches SWa, SWb, SWc, and SWd for selecting either of the output signals of the bandpass filters 1a, 1b, 1c, and 1d and the output signals of the respective corresponding multipliers 3a, 3b, 3c, and 3d are provided for each band, with the output signals of the switches SWa, SWb, SWc, and SWd summed up in the addition section 6. Using the switches SWa, SWb, SWc, and SWd, a particular band can be selected for use either with foreign language speech components or with noise-vocoded components. In other words, the switches SWa, SWb, SWc, and SWd can be used to select and adjust the number of bands, in which noise-vocoded components are used. For this purpose, the band setup means 22 is provided with a switch information register, which stores switch information, with the switch information in the register used to change the signal selections in the switches SWa, SWb, SWc, and SWd. In the Noise-Vocoded Speech Sound generation section 21, the switch information register may be a 4-bit register, and the switch information may be 4-bit information. In addition, the band boundary frequencies, in other words, boundary frequencies of the bandpass filters 1a and 4a, 1b and 4b, 1c and 4c, 1d and 4d are made adjustable. A band boundary frequency register used for band boundary frequency information is provided in the band setup means 22, and the band boundary frequency information entered in the register is supplied to the bandpass filters to adjust the band boundary frequencies of the bandpass filters. When there are four sets of bandpass filters, such as la and 4a, 1b and 4b, 1c and 4c, 1d and 4d, there are three frequencies used as the band boundary frequencies, and it is sufficient to adjust and set the band boundary frequency information for the lowest three. Detailed examples regarding the switch information and band boundary frequency information are provided below.

The control section 30 comprises a response evaluation control means 31, a correct answer storage means 32, a speech source selection means 33, a band selection means 34, a display control means 36, and an input analysis means 35. Correct answer character information is stored in the correct answer storage means 32 as correct answer information for each task stored in the speech source signal section 20. Correct answer 1 is correct answer character information corresponding to each task of the speech source 1 used for beginners, correct answer 2 is correct answer character information corresponding to each task of the speech source 2 used for intermediate learners, and correct answer 3 is correct answer character information corresponding to each task of the speech source 3 used for advanced learners. In the same manner as the speech source 1, speech source 2, and speech source 3, the correct answer character information can be individually selected using difficulty identifiers Di=1 to 3 and task numbers Qj=1 to 10. The acceptance section 15, which is a means for response input by the learner, accepts response results inputted by the learner. The acceptance section 15 can be constituted by a 10-key keypad, a keyboard, etc. The input analysis means 35, which is a means for analyzing input information obtained from the acceptance section 15 and converting it to character string information and number information, can be implemented in a device driver etc. used for input on a 10-key keypad, a keyboard, etc. The display section 14, which is a display means such as a liquid crystal display, etc., displays information outputted from the display control means 36 driven by a display device driver etc. In addition, the inputted character string information and number information is supplied from the input analysis means 35 to the display control means 36, with the character strings and numbers displayed on the display section 14. Based on a procedure to be described later, the response evaluation control means 31 supplies any of a difficulty identifier Di=1 to 3 and a task number Qj=1 to 10 to the speech source selection means 33 and supplies band boundary frequency information and switch information to the band selection means 34. The band selection means 34 supplies band boundary frequency information and switch information to the band setup means 22 illustrated in FIG. 6. The speech source selection means 33 passes the difficulty identifier Di and task number Qj, supplied from the response evaluation control means 31, on to the speech source signal section 20 and to the correct answer storage means 32. The speech source signal section 20 reads a task based on the difficulty identifier Di and task number Qj and supplies the task to the Noise-Vocoded Speech Sound generation section 21. Based on the difficulty identifier Di and task number Qj supplied from the speech source selection means 33, the correct answer storage means 32 selects the correct answer character information corresponding to the task read by the speech source signal section 20 and supplies it to the response evaluation control means 31. The response evaluation control means 31 compares the correct answer character information supplied from the correct answer storage means 32 with the character string information and number information of the response supplied from the input analysis means 35, and, in accordance with a procedure that will be described later, selects a next task of the same degree of difficulty and a task with a different degree of difficulty and supplies any of the corresponding difficulty identifiers Di=1 to 3 and the task numbers Qj=1 to 10 to the speech source selection means 33. Moreover, the response evaluation control means 31 supplies the correct answer character information to the display control means 36, displaying the character string of the correct answer on the display section 14. The response evaluation control means 31 controls the operation of the correct answer storage means 32, speech source selection means 33, band selection means 34, display control means 36, and input analysis means 35.

Figure 7:
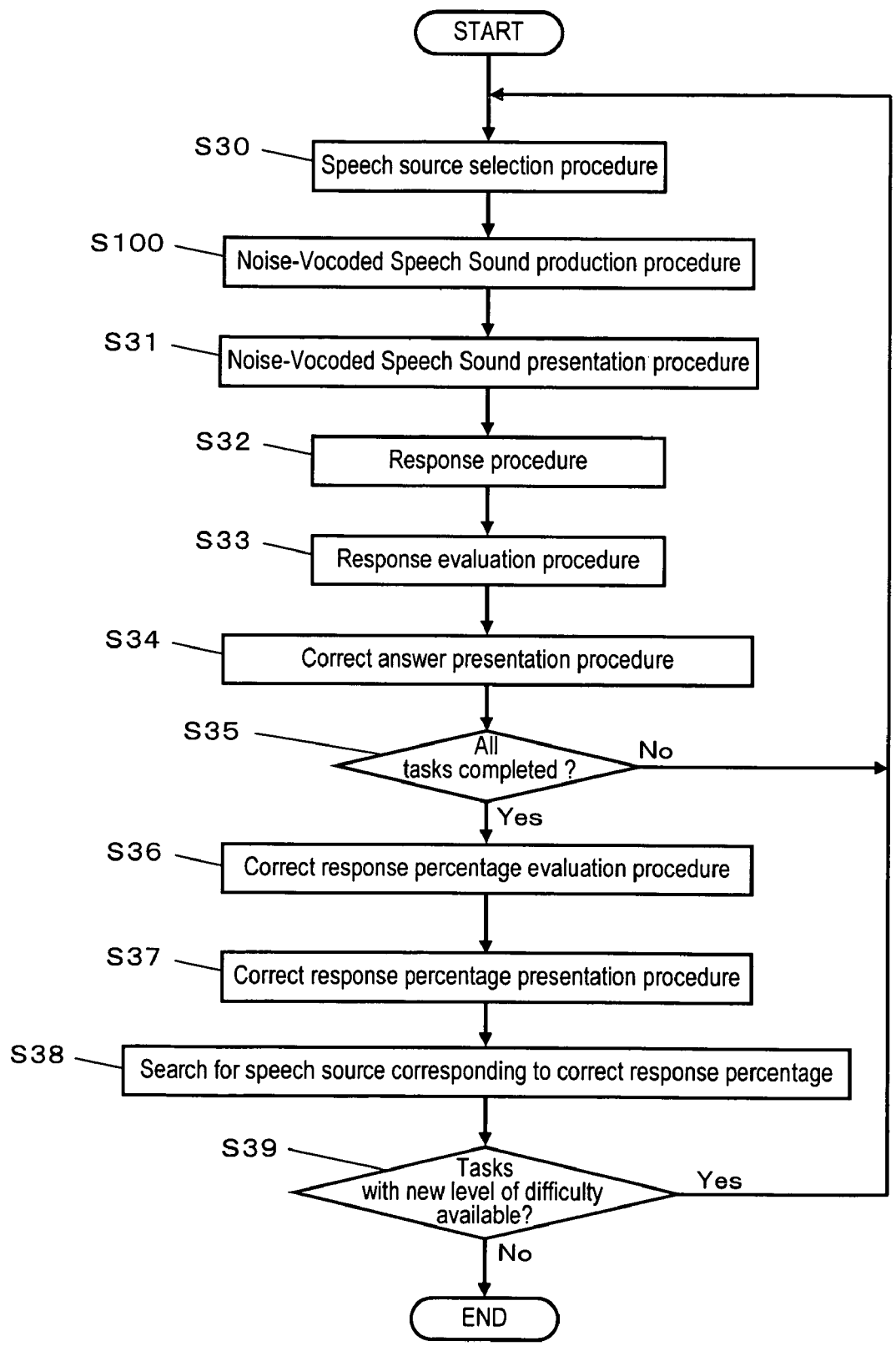
FIG. 7 is a flow chart illustrating the operation of a foreign language learning apparatus according to an embodiment of the present invention.

FIG. 7 is a flow chart illustrating the operating procedure of the foreign language learning apparatus of this embodiment. FIG. 7 is a flow chart illustrating a case, in which the difficulty of aural perception of the speech signal is varied. When the power supply of the foreign language learning apparatus is turned on, the response evaluation control means 31 first supplies the switch information and band boundary frequency information stored in the band selection means 34 in advance to the band setup means 22, and then carries out the setup of the band boundary frequencies of the frequency bands with degraded speech and the number of frequency bands. Next, in the speech source selection procedure of (Step S30), the response evaluation control means 31 supplies the difficulty identifier Di=1 and the task number Qj=1 of the speech source 1 used for beginners to the speech source selection means 33. The speech source selection means 33 passes the difficulty identifier Di=1 and task number Qj=1 on to the speech source signal section 20, causing the speech source 1 to be selected in the speech source signal section 20 and causing the speech signal of the speech source 1 to be supplied to the Noise-Vocoded Speech Sound generation section 21. In addition, the speech source selection means 33 passes the difficulty identifier Di=1 and task number Qj=1 on to the correct answer storage means 32, causing the correct answer storage means 32 to select the correct answer 1 and to output the correct answer 1 to the response evaluation control means 31.

Processing advances to (Step S100), and the Noise-Vocoded Speech Sound production procedure described in FIG. 4 is carried out. Processing then advances to (Step S31), and a Noise-Vocoded Speech Sound presentation procedure is carried out. This procedure is a procedure used for presenting the Noise-Vocoded Speech Sound signal generated by the Noise-Vocoded Speech Sound generation section 21 of FIG. 6 to the learner for listening through the headphones 13. Needless to say, when the output terminal 8 supplies the Noise-Vocoded Speech Sound signal to the headphones 13, digital sample information on the Noise-Vocoded Speech Sound signal is supplied upon conversion to an analog signal by a digital-to-analog converter and a power amplifier, not shown.

Next, processing advances to (Step S32) and, in a response procedure, the learner listens to the task and inputs his/her response into the acceptance section 15. The acceptance section 15 accepts the response results. In the input analysis means 35, the response information, which constitutes the learners' response results, is converted into character string information made up of words and sentences and supplied to the response evaluation control means 31.

Next, processing advances to the response evaluation procedure (Step S33), where the response evaluation control means 31 of the control section 30 compares the character string information of the response with the character string information of the correct answer to the task specified by the task number Qj=1 and difficulty identifier Di=1 received in (Step S30) above, deciding that the answer is correct in case of a match, and that it is incorrect in case of a mismatch. The response evaluation control means 31 records the number of correct answers or the number of incorrect answers in the correct answer number storage means it is provided with internally.

Next, processing advances to the correct answer presentation procedure (Step S34), where the response evaluation control means 31 supplies the character string information of the correct answer to the display control means 36, and the display control means 36 displays the character string of the correct answer on the display section 14. The learner compares his/her own answer with the correct answer and learns by identifying mistakes.

Next, processing advances to (Step S35), where the response evaluation control means 31 decides whether the task number Qj is Qj=10 for the stored task number Qj=1. If Qj=10 is false, the answer is "No", because all tasks have not been completed yet for tasks with the difficulty identifier Di=1. The response evaluation control means 31 stores a new Qj, obtained by adding one to Qj, and processing returns to (Step S30).

In (Step S30), the response evaluation control means 31 supplies a difficulty identifier Di=1 and a task number Qj=2 to the speech source selection means 33. Using the procedure of (Step S30) through (Step S34), learning can be carried out using speech signal-based tasks with the difficulty identifier Di=1 and task number Qj=2. The control section 30 repeats the procedure of (Step S30) through (Step S35) until Qj=10. During this series of procedures, in (Step S33), the response evaluation control means 31 accumulates records of the number of correct answers or the number of incorrect answers in the correct answer number storage means, with which it is provided internally.

In (Step S35), the response evaluation control means 31 decides whether task number Qj is Qj=10 for the stored difficulty identifier Di=1 and task number Qj. When Qj=10, the answer is "Yes", because all the tasks have been completed for tasks with the difficulty identifier Di=1, and processing advances to (Step S36). In the correct response percentage evaluation procedure of (Step S36), the response evaluation control means 31 examines the number of correct answers and the number of incorrect answers stored in the correct answer number storage means and calculates the ratio of the number of correct answers to the sum of the number of correct answers and the number of incorrect answers, i.e. the correct response percentage CI (%).

Next, processing advances to the correct response percentage presentation procedure (Step S37), where the response evaluation control means 31 passes the calculated correct response percentage information on to the display control means 36, displaying the numerical value (%) of the correct response percentage CI on the display section 14. Next, processing advances to the procedure of search for the speech source corresponding to the correct response percentage (Step S38), wherein the response evaluation control means 31 decides whether the correct response percentage CI is at or higher than a predetermined threshold, e.g. 75%, and, when it is equal or higher than the threshold value, adds 1 to the difficulty identifier D1, producing Di=2, sets the task number to Qj=1, and supplies this information to the speech source selection means 33. The speech source selection means 33 checks whether information on the correct answers and the speech source of the tasks corresponding to the difficulty identifier Di=2 and task number Qj=1 are in the correct answer storage means 32 and the speech source signal section 20. If they are found, the speech source selection means 33 passes the correct answer character information corresponding to the task number Qj=1 and difficulty identifier Di=2 from the correct answer storage means 32 to the response evaluation control means 31.

The response evaluation control means 31 advances to (Step S39) and makes a decision as to the presence of tasks with a new level of difficulty. By receiving the correct answer character information corresponding to the difficulty identifier Di=2 and task number Qj=1, the response evaluation control means 31 determines that a task with a new level of difficulty is present, thereby producing a "Yes" and returning to (Step S30).

During steps (Step S30) through (Step S35), tasks with a difficulty identifier Di=2 and task numbers Qj=1 to 10 are supplied as Noise-Vocoded Speech Sound signals to the learner through the headphones 13, and the speech source 2, which is used for intermediate learners, is used as a teaching tool for foreign language learning. In (Step S35), upon reaching Qj=10, there are no more tasks with a difficulty identifier of Di=2, and processing advances from (Step S36) to (Step S39), wherein a decision is made as to the correct response percentage CI corresponding to the 10 tasks with a difficulty identifier of Di=2 and, if the correct response percentage CI is not less than a predetermined threshold, then the learner is presented with 10 tasks from the speech source 3, which is used as a teaching tool of even greater difficulty used for advanced learners, with a difficulty identifier of Di=3.

If the learning of the 10 tasks from the advanced learner's teaching tool with a difficulty identifier of Di=3 is over and the correct response percentage CI is not less than a predetermined threshold, the response evaluation control means 31 is no longer supplied with correct answer character information from the correct answer storage means 32 (Step S39), as a result of which the response evaluation control means 31 generates character information regarding the completion of learning, supplying it to the display control means 36, and the display control means 36 displays a character message regarding the completion of learning on the display section 14.

High learning effects are obtained because, as described above, in accordance with the procedure of the flow chart of FIG. 7, the difficulty of tasks is adjusted and tasks with a higher level of difficulty are presented when the correct response percentage CI of the learners' response results is higher than the threshold value.

In addition, another possible approach is as follows. A correct response percentage storage means is provided in the response evaluation control means 31 and calculated correct response percentages are stored in the correct response percentage storage means as threshold values. After calculating the correct response percentage CI for the current exercise, the response evaluation control means 31 then compares the current correct response percentage CI with a threshold value stored in the correct response percentage storage means, i.e. the previous correct response percentage. If the correct response percentage CI is higher than the threshold value, the response evaluation control means 31 determines that the correct response percentage has gone up, increases the difficulty identifier Di, and directs the speech source selection means 33 to select the next exercise. By doing so, high learning effects are obtained because as the correct response percentage CI of the learners' response results increases, the difficulty of the tasks is adjusted and tasks of a higher level of difficulty are presented.

It should be noted that speech signals from speech sources of the same level of difficulty and the correct answer information corresponding to the speech signals may be stored in a plurality of categories depending on the level of difficulty, such that if the correct response percentage CI is below a predetermined threshold value, another task of the same level of difficulty may be selected and presented in (Step S38). If the correct response percentage CI is smaller than another predetermined threshold value, the apparatus may be adapted to select a task with a lower level of difficulty.

Furthermore, although according to the flow chart, the presentation of the tasks starts from the task with the lowest level of difficulty, the level of difficulty may be selected by the learners. To this end, immediately after the start of the process, the response evaluation control means 31 supplies "1. Beginner", "2. Intermediate Learner", "3. Advanced learner", "Please select number", and other character information to the display control means 36 in order to display it on the display section 14 to urge the learner to make a selection. When the number selected by the learner is inputted to the acceptance section 15, the input analysis means 35 passes the number information on to the response evaluation control means 31. The response evaluation control means 31 may use the received number information as a difficulty identifier Di, supplying it along with the task number Qj=1 to the speech source selection means 33 to select a task with a speech signal of an arbitrary level of difficulty.

Although in the explanation above each piece of correct answer character information used for the correct answer 1, correct answer 2, and correct answer 3 was stored in the correct answer storage means 32 provided in the control section 30, each piece of correct answer character information used for the correct answer 1, correct answer 2, and correct answer 3 may also be paired with the speech source 1, speech source 2, and speech source 3 and stored in the speech source signal section 20. In such a case, when the speech source selection means 33 selects any of the speech source 1, speech source 2, or speech source 3, the correct answer character information paired therewith can be extracted by the speech source selection means 33 and passed on to the response evaluation control means 31.

To change the difficulty of aural perception among speech source 1, speech source 2, and speech source 3, the speech signals are selected such that the sentences, words, idioms, and other utterances constituting the speech sources are mutually different. Otherwise, the speech source 1, speech source 2, and speech source 3 produce speech signals with different speeds of pronunciation. Additionally, the speech signals have different pitch frequencies in the speech source 1, speech source 2, and speech source 3. Also, speech signals spoken in a male, female, or child's voice may be used for the speech source 1, speech source 2, and speech source 3.

Moreover, the speech source signal section 20 may be provided with speech signal speed changeover means or pitch frequency changeover means, in such a manner that speech signals provided by the speech source 1, speech source 2, and speech source 3 are supplied to the Noise-Vocoded Speech Sound generation section 21 after changing their speech production speed using the speed changeover means or changing their pitch frequencies using the pitch frequency changeover means. In such a case, the speech signals provided by the speech source 1, speech source 2, and speech source 3, which are stored in the speech source signal section 20, are constituted by data in the form of digital samples that serve as the basis for the speech signals that the speech source signal section 20 supplies to the Noise-Vocoded Speech Sound generation section 21. In such a case, the speech source selection means 33 of the control section 30 needs only to supply speed-indicating information or pitch frequency-indicating information to the speed changeover means or the pitch frequency changeover means in the speech source signal section 20 in accordance with the learner's response results. As for specific examples of the speed changeover means and pitch frequency changeover means, well-known means can be used that are based on combining various types of processing, such as procedures, in which the read speed of the digital sample data of the speech signal is varied, procedures, in which the read digital sample data is repeatedly introduced when the amount of the digital sample data becomes insufficient as a result of high-speed reading, and procedures, in which data is thinned out when too much speech signal-related digital sample data is available as a result of low-speed reading.

In addition, the following is sufficient when using a speech synthesis system based on compilation, i.e. a speech signal generation system in which, as already explained above, subjects, predicates, objects, adverbs, particles, etc. that make up sentences, as well as various words and other sentence constituents, are stored in advance in speech signal form for use as the speech signals of the speech source 1, speech source 2, and speech source 3 stored in the speech source signal section 20, and, by selecting and linking the constituents together, a single sentence is formed. In other words, the response evaluation control means 31 uses the received number information as a difficulty identifier Di and supplies it to the speech source selection means 33 along with a task number Qj. The speech source selection means 33 passes the difficulty identifier Di and task number Qj on to the speech source signal section 20. Based on the difficulty identifier Di and task number Qj, the speech source signal section 20 selects words that constitute a sentence in a task, composes a single sentence, and supplies it to the Noise-Vocoded Speech Sound generation section 21 in speech signal form. To do this, a table of correspondence between the difficulty identifiers Di and task numbers Qj and sets of identifiers of the corresponding sentence constituents is provided in the speech source signal section 20. Using the difficulty identifier Di and task number Qj obtained from the speech source selection means 33, the speech source signal section 20 checks the identifiers of the constituents being used by referring to the correspondence table, reads the speech signals that serve as elements of the identifiers in the order of the identifiers and generates speech signals constituting a series of sentences. Thus, the speech signals of the sentence elements that make up the sentences, which are the speech signals stored by the speech source signal section 20, correspond to speech signals in digital sample form used to create the speech signals supplied to the Noise-Vocoded. Speech Sound generation section 21. It should be noted that each one of the speech signals of the respective elements may be regarded as a speech signal supplied by the speech source selection means 33. In this case, we can think of the speech source signal section 20 as supplying them to the Noise-Vocoded Speech Sound generation section 21 in a single set made up of a plurality of consecutive speech signals.

Embodiment 5

In this embodiment, the band boundary frequencies and the number of frequency bands are adjusted depending on the state of progress in the learner's training. Because the configuration of the foreign language learning apparatus of this embodiment is similar to the configuration described in FIG. 5 and FIG. 6, explanations will focus on a different aspect.

Figure 6:
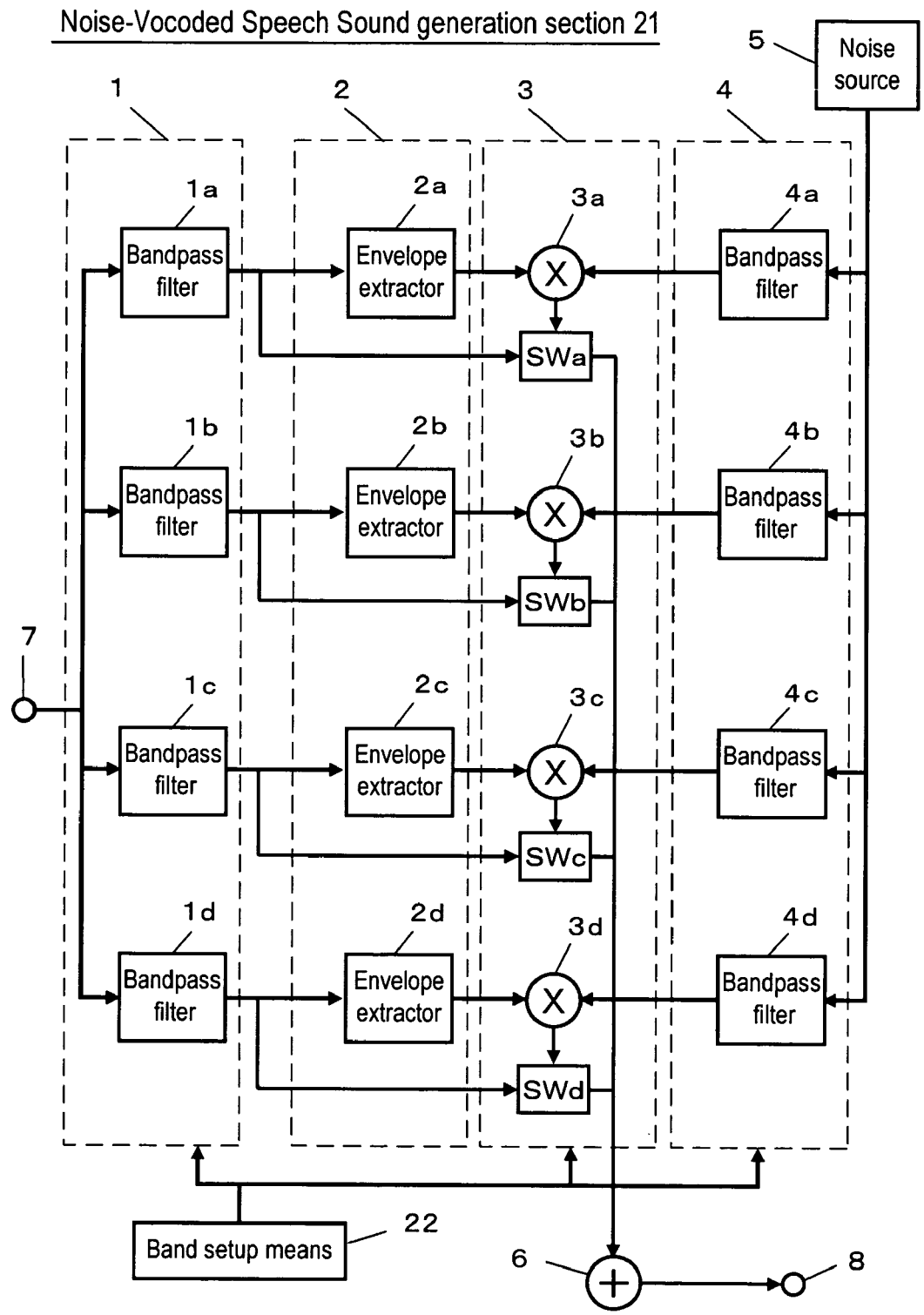
FIG. 6 is a block diagram of a Noise-Vocoded Speech Sound generation section according to an embodiment of the present invention.

In the Noise-Vocoded Speech Sound generation section 21 illustrated in FIG. 6, the high pass cutoff frequencies of the bandpass filters $1a$ and $4a$ are designated as fa (Hz). The low pass cutoff frequencies of the bandpass filters $1a$ and $4a$, as well as the high pass cutoff frequencies of the bandpass filters $1b$ and $4b$, i.e. the band boundary frequencies, are designated as fab (Hz). The low pass cutoff frequencies of the bandpass filters $1b$ and $4b$, as well as the high pass cutoff frequencies of the bandpass filters $1c$ and $4c$, i.e. the band boundary frequencies, are designated as fbc (Hz). The low pass cutoff frequencies of the bandpass filters $1c$ and $4c$, as well as the high pass cutoff frequencies of the bandpass filters Id and $4d$, i.e. the band boundary frequencies, are designated as fcd (Hz). The low pass cutoff frequencies of the bandpass filters $1d$ and $4d$ are designated as fd (Hz). A set of band boundary frequency information objects is represented as {fd, fcd, fbc, fab, fa}. When there are M sets of band boundary frequency information objects, a single set of band boundary frequency information objects is represented as {fm}={fdm, fcdm, fbcm, fabm, fam}. Here, m=1-M. The letter m represents identifier information identifying sets of band boundary frequency information objects.

In addition, the switch information of the switches SWa, SWb, SWc, and SWd is designated as Sa, Sb, Sc, and Sd. When the switch information=1, the items selected in the switches SWa, SWb, SWc, and SWd are the output signals of the bandpass filters $1a$, $1b$, $1c$, and $1d$, and when the switch information=0, the output signals of the multipliers $3a$, $3b$, $3c$, and $3d$ are selected. A set of switch information objects is represented as {S}={Sd, Sc, Sb, Sa}. It should be noted that when Sd=Sc=Sb=Sa=1, the output signal at the output terminal 8 of the Noise-Vocoded Speech Sound generation section 21 is practically identical to the speech source signal at the input terminal 7, reverting to the speech source signal which does not contain noise-vocoded components. When Sd=Sc=Sb=Sa=0, all the frequency bands of the output signal at the output terminal 8 of the Noise-Vocoded Speech Sound generation section 21 turn into noise-vocoded components. When there are N sets of switch information objects, a single set of switch information objects is represented as {Sn}={Sdn, Scn, Sbn, San}. Here, n=1-N. The letter n represents identifier information identifying sets of switch information objects.

Moreover, the correct response percentage is represented by CI (%), with the threshold values of the correct response percentage set to 25%, 50%, and 75%. When the correct response percentage CI is 0%≦CI≦25%, m=1 and n=1; when it is 25%<CI≦50%, m=2 and n=2; when it is 50%<CI≦75%, m=3 and n=3; and when it is 75%<CI≦100%, m=4 and n=4. It should be noted that in such a case M=N=4.

Sets of band boundary frequency information objects with m=1-M, {fm}={fdm, fcdm, fbcm, fabm, fam} (where m=1-M), and sets of switch information objects with n=1-N, {Sn}={Sdn, Scn, Sbn, San} (where n=1-N) are represented in table form and stored in the storage means of the band selection means 34. Examples of the tables, in which M=N=4, are illustrated in FIGS. 9A and 9B.

In addition, a correspondence table is stored in the storage means of the response evaluation control means 31, the table containing threshold value information showing the threshold values of the correct response percentage at 25%, 50%, and 75%, so that when the correct response percentage CI is 0%≦CI≦25%, m=1 and n=1; when it is 25%<CI≦50%, m=2 and n=2; when it is 50%<CI≦75%, m=3 and n=3; and when it is 5%<CI≦100%, m=4 and n=4. An example of the correspondence table is illustrated in FIG. 9C. It should be noted that values other than the ones mentioned above can be used as the threshold values.

Figure 8:
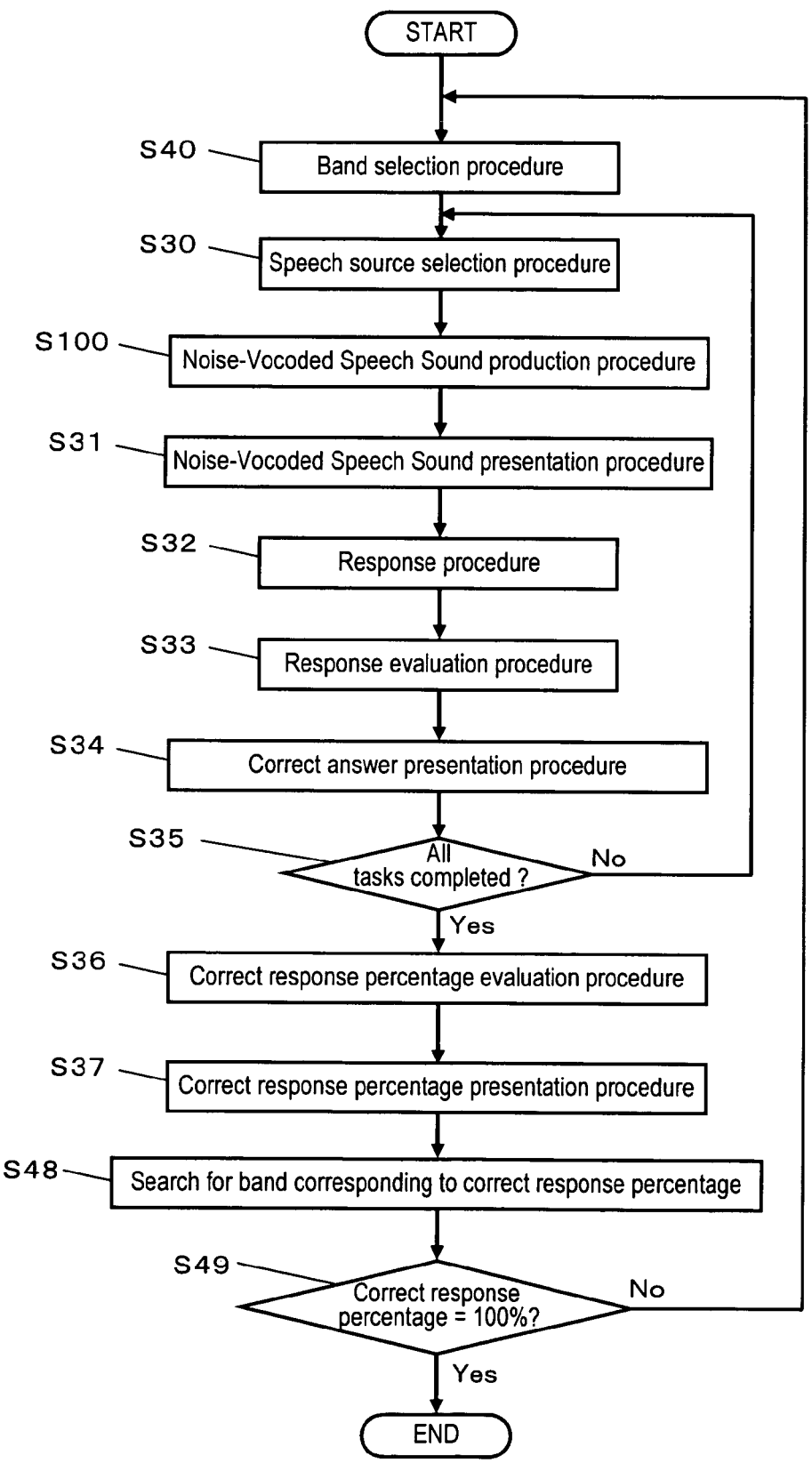
FIG. 8 is a flow chart of operation of another foreign language learning apparatus according to an embodiment of the present invention.

FIG. 8 is a flow chart of the operating procedure of the foreign language learning apparatus used in the present embodiment. It should be noted that the explanations below assume that {S1}={0, 0, 0, 0}, {S2}={0, 1, 0, 0}, {S3}={0, 1, 0, 1}, and {S4}={1, 1, 1, 1}. When the power supply of the foreign language learning apparatus of the present invention is turned on, in (Step S40), the response evaluation control means 31 passes identifier information m=1 and identifier information n=1, i.e. (m,n)=(1,1), on to the band selection means 34. By referring to the table of FIG. 9A and to the table of FIG. 9B in the storage means, the band selection means 34 selects band boundary frequency information objects {f1} with m=1 and switch information objects {S1} with n=1 and supplies them to the band setup means 22. The band setup means 22 sets the band boundary frequencies of the frequency bands with degraded voice and sets the number of frequency bands in the Noise-Vocoded Speech Sound generation section 21 based on band boundary frequency information {f1} and switch information {S1}. When the switch information {S1} is {0, 0, 0, 0}, the entire speech signal region turns into noise-vocoded components.

Next, in the speech source selection procedure of (Step S30), the response evaluation control means 31 supplies the difficulty identifier Di=1 and the task number Qj=1 of the speech source 1 used for beginners to the speech source selection means 33. The speech source selection means 33 passes the difficulty identifier Di=1 and the task number Qj=1 to the speech source signal section 20, causing the speech source 1 to be selected in the speech source signal section 20 and causing the speech signal of the speech source 1 to be supplied to the Noise-Vocoded Speech Sound generation section 21. In addition, the speech source selection means 33 passes the difficulty identifier Di=1 and task number Qj=1 on to the correct answer storage means 32, causing the correct answer storage means 32 to select the correct answer 1 and to output the correct answer 1 to the response evaluation control means 31.

Next, processing advances to (Step S100), where the Noise-Vocoded Speech Sound generation section 21, based on the band boundary frequency information {f1} and switch information {S1}, generates a Noise-Vocoded Speech Sound signal from the speech signal of the speech source 1 corresponding to the task number Qj=1. The procedure between the subsequent (Step S31) and (Step S35) is the same as the one explained in Embodiment 4 with reference to FIG. 7. When the 10-task training ends, "Yes" is produced in (Step S35), and processing advances to (Step S36), where the response evaluation control means 31 calculates the correct response percentage CI. Next, processing advances to (Step S37), and the correct response percentage CI is displayed on the display section 14. The procedure of (Step S36) and (Step S37) is the same as the one explained in Embodiment 4 with reference to FIG. 7.

Next, processing advances to the procedure of search for the band corresponding to the correct response percentage (Step S48). In (Step S48), the response evaluation control means 31 searches the correspondence table of FIG. 9C stored in the storage means provided therein for the row, to which the correct response percentage CI corresponds, reads the set (m, n) of identifier information objects corresponding to the value of the correct response percentage CI, and passes it on to the band selection means 34. To check for the row corresponding to the correct response percentage CI by searching the correspondence table of FIG. 9C, it is sufficient to compare the correct response percentage CI and the threshold value information, i.e. 25%, 50%, and 75%, with the help of the comparison means provided in the response evaluation control means 31 and determine which threshold value range the correct response percentage CI falls into.

Next, processing advances to (Step S49), where "Yes" is produced if the correct response percentage is 100%, which terminates the training. If the correct response percentage CI is less than 100%, "No" is produced, and processing returns to (Step S40). Upon return to (Step S40), the band selection means 34 uses the (n, m) provided by the response evaluation control means 31 to the band selection means 34 to search the tables of FIGS. 9A and 9B, reads {fm} and {Sn}, and passes them on to the band setup means 22. The band setup means 22 uses {fm} and {Sn} to set the switches and the frequency characteristics of each bandpass filter in the Noise-Vocoded Speech Sound generation section 21.

The procedure of (Step S30) through (Step S35) is then repeated. If the correct response percentage CI is 30%, (m,n)=(2, 2) is selected from the correspondence table of FIG. 9C and, based on the table of FIG. 9B, the switches are set in accordance with {S2}32 {0, 1, 0, 0}. The portion of the speech signal corresponding to the band of the bandpass filter 1c is turned into a band noise component. As the correct response percentage improves, the number of "1"-bits in {Sdn, Scn, Sbn, San} increases such that, in the speech signals of the speech source 1 used for task numbers Qj=1 through 10, the number of bands, in which the speech signal components of the speech source 1 are used, increases. When the correct response percentage CI exceeds 75%, (m, n)=(4, 4) and {S4}={1, 1, 1, 1}, such that speech source signal components are used across all the bands, reverting to the original speech signal. In this manner, in the foreign language learning apparatus of the present embodiment, the values of the identifiers (m, n) in the correspondence table of FIG. 9C grow and the ratio of the noise-vocoded components and original speech signal components changes as the training progresses and the correct response percentage CI grows.

Below, explanations are provided regarding the significance of the information contained in {fm} and {Sn}. It is believed that, in the initial period of training, the brain has almost no neural circuits used for discerning and understanding the foreign language. Under such conditions, {Sn} is set to {0,0,0,0} to activate brain cells in regions that are not normally used by the learner and facilitate the formation of new neural circuits. The frequency bands of all the bandpass filters turn into Noise-Vocoded Speech Sound, activating cells in various regions of the brain. This happens because normally used frequency information cannot be utilized when training begins with a drastically reduced number of bands, such that the brain attempts to perceive and discriminate speech without the frequency information. At such time, a substitutive (compensatory) mechanism starts operating in the brain if there is something that appears to be usable, albeit not normally used. Such operation, however, creates a need to use brain regions that are not normally used, thereby establishing a new neural network. Continued training in this state provides a certain, albeit low, ability to discern the foreign language, and the correct response percentage CI exceeds 25%. At this stage, not all of the frequency bands represent Noise-Vocoded Speech Sound components, with original speech signal components being used in some of the frequency bands of the bandpass filters. In other words, some of the bits in {Sn} are "1"s. As the correct response percentage CI improves, the number of "1"s among the bits in {Sn} is increased. During this process, along with activation of brain cells in regions other than those activated in the initial case of {Sn}={0, 0, 0, 0}, further formation and strengthening of the brain's neural circuits necessary for understanding the foreign language take place. In the stage, in which the correct response percentage CI approaches 100%, {Sn}={1, 1, 1, 1}, with the Noise-Vocoded Speech Sound generation section outputting a signal practically identical to the speech signal. In other words, the frequency bands of all the bandpass filters are turned into the original speech signal components, completing the strengthening of the neural brain circuits necessary for discerning the foreign language. For the Noise-Vocoded Speech Sound generation section to output a signal identical to the speech signal, {Sn} is set to {1,1,1,1}, such that all frequency band signals are made up of original speech signal components. It should be noted that there may be provided a switch directly connecting the original speech signal to the output terminal 8. The term "signal practically identical to the speech signal" means "signal with frequency components completely identical to the speech signal" or "signal having generally identical frequency components". In other words, in the bandpass filter section 1, the frequency components and the phase of the original speech signal are adjusted in accordance with the frequency characteristics and phase characteristics of the filters, as a result of which the frequency components of the signal appearing at the output terminal 8 and its phase characteristics are sometimes not completely identical to the original speech signal, but in such cases it can also be called a "practically identical" signal.

As far as band boundary frequency information {fm} is concerned, in the same line of thought, the formation of neural brain circuits necessary for discerning the foreign language and their strengthening can be carried out by supplying atypical acoustic stimuli to the brain by creating various band frequency divisions. For instance, effects similar to band number adjustment can be achieved through the use of switch information {Sn} if four frequency bands are set up initially, and as the correct response percentage CI improves, the bandwidth of the frequency bands subject to band noise degradation is made narrower and the bandwidth of the frequency bands that are not subject to band noise degradation is made wider, and, when the correct response percentage CI becomes high enough, the bandwidth of the frequency bands subject to band noise degradation is set to zero. Moreover, if {f1}={fd1, fcd1, fbc1, fab1, fa1} is set to {100 Hz, 100 Hz, 8000 Hz, 8000 Hz, 8000 Hz}, the frequency bandwidth of the bandpass filters 1d, 4d, 1b, 4b, 1a, and 4a becomes close to 0 Hz, and the frequency bandwidth of the bandpass filters 1c and 4c increases from about 100 Hz to 8000 Hz, with the number of bands reduced to one. When the speech signal of this band is converted to a noise-frequency band signal, there are almost no original speech signal components left and the number of extracted envelope signals is reduced to one as well, resulting in a Noise-Vocoded Speech Sound signal with a high difficulty of aural perception. As the frequencies are adjusted from {f2} to {f3} to {f4}, approaching values such as fcd=600 Hz, fbc=1500 Hz, and fab=2500 Hz, the difficulty of aural perception decreases to a certain extent, making the speech easier to recognize. Furthermore, as the four-frequency band signal goes from a band noise signal back to speech signal components, it becomes even easier to recognize. Therefore, changing the band boundary frequencies makes it possible to change the number of bands along with changing the bandwidth of the bandpass filters.

In addition, another possible approach is as follows. A correct response percentage storage means is provided in the response evaluation control means 31 and calculated correct response percentages are stored in the correct response percentage storage means as threshold values. After calculating the correct response percentage CI for the current exercise, the response evaluation control means 31 then compares the current correct response percentage CI with a threshold value stored in the correct response percentage storage means, i.e. the previous correct response percentage. If the current correct response percentage CI is greater than the threshold value, the response evaluation control means 31 determines that the correct response percentage has gone up, increases the values of n and m, and directs the band selection means 34 to select the band boundary frequencies and the number of bands corresponding to (m, n).

Four sets of band boundary frequencies, for which m ranged from 1 to 4, were selected in the table of FIG. 9A. Selection from a large number of sets of band boundary frequencies may be achieved by increasing the number represented by m. In addition, the values of the band boundary frequencies may be continuously varied so as maintain a direct or inverse proportion to the magnitude of the correct response percentage CI. The band boundary frequencies of the bandpass filters may be varied as a function of the correct response percentage CI.

Thus, in the same manner as explained in Embodiment 1, after training by listening to a Noise-Vocoded Speech Sound signal with a high difficulty of aural perception, listening to regular speech results in discrimination of differences that were previously impossible to discriminate and, as a result of such discrimination, acquiring the ability for genuine correct pronunciation in the foreign language. As a result, the ability to discriminate the foreign language increases and speech production skills improve as well. Therefore, effects can be expected not only in terms of hearing, but in terms of speaking as well. In the present embodiment, foreign language learning effects can be achieved in many respects because the band boundary frequencies and the number of noise-vocoded bands are successively varied.

Neither the content nor the form of expression of the band boundary frequency information {fm} and switch information {Sn} are limited to the examples above. The correspondence between the correct response percentage CI and (m, n) can be based on methods other than the correspondence table of FIG. 9C. For instance, Noise-Vocoded Speech Sound signals can be presented to the learner by adjusting the m and n in (m, n) at random and combining various band boundary frequency information {fm} and switch information {Sn}.

Although in this embodiment explanations referred to the use of the speech source 1 intended for beginners, needless to say, the speech source 2 used for intermediate learners and the speech source 3 used for advanced learners can be employed as well. A procedure may be added for allowing the learners to select the speech source used and a procedure may be combined therewith for adjusting the level of difficulty of the speech source used as the correct response percentage improves.

The operation of the Noise-Vocoded Speech Sound generation section 21 (Step S100) in Embodiment 4 and Embodiment 5 above may be similar to the procedures of (Step S11) to (Step S16) illustrated in FIG. 4. It should be noted that if the switches SWa, SWb, SWc, and SWd illustrated in FIG. 6 are not used for selecting noise-vocoded components, the operation of multiplication can be omitted for the corresponding band. The processing steps can be executed sequentially, as shown in FIG. 4, or in parallel, in synchronization with the frequency of sampling of speech source signal information. These procedures can be implemented in the form of a software program for a digital signal processor (DSP). The bandpass filtering procedures can be implemented using well-known arithmetic processing programs used for digital filtering. For the envelope extraction procedure, it is sufficient to subject the bandpass-filtered speech data to half-wave rectification and low-pass filtering to remove high-frequency fluctuations. In addition, the bandpass-filtered speech data may be half-wave rectified, with the peak values of the output waveform data used as envelope data. Detailed explanations are omitted herein because various types of such digital waveform processing are well-known in software programs for digital signal processors (DSP). Moreover, processing performed by digital signal processors (DSP) can be implemented using MPU and semiconductor memory-based computer systems as well as software programs stored in memory.

Usually, the control section 30 in Embodiment 4 and Embodiment 5 above can be implemented using MPUs, memory, etc. Semiconductor memory, hard disk memory, and other storage media can be used as memory. Non-volatile storage media are suitable as such storage media, but volatile storage media can be used as well. The processing steps performed by the control section 30 are typically implemented through software, with the software recorded on recording media such as ROM and the like. However, it can also be implemented through hardware (dedicated circuits). The response procedure (Step S32), correct answer presentation procedure (Step S34), and correct response percentage presentation procedure (Step S37) can be implemented through device drivers for input means such as 10-key keypads and keyboards, as well as through software for display screen control, etc. The concept of "displaying output on the display section 14" includes displaying things onscreen, printing to a printer, audio output, transmission to external devices, etc. In addition, the display section 14 may be thought of as including output devices, such as a display, speakers, etc., or as not including such devices. Storage media, such as semiconductor memory, hard disk memory, etc., can be used for the speech source signal section 20 and correct answer storage means 32. Storage media such as semiconductor memory and hard disk memory can also be used for storage means provided in the band selection means 34 and response evaluation control means 31. In addition, a CD-ROM storage device may be used for the speech source signal section 20 and correct answer storage means 32, in which case the speech source signal section 20 and correct answer storage means 32 are recorded on recording media, such as a CD-ROM disk, and the CD-ROM disk is read using a CD-ROM drive unit.

Embodiment 6

Figure 10:
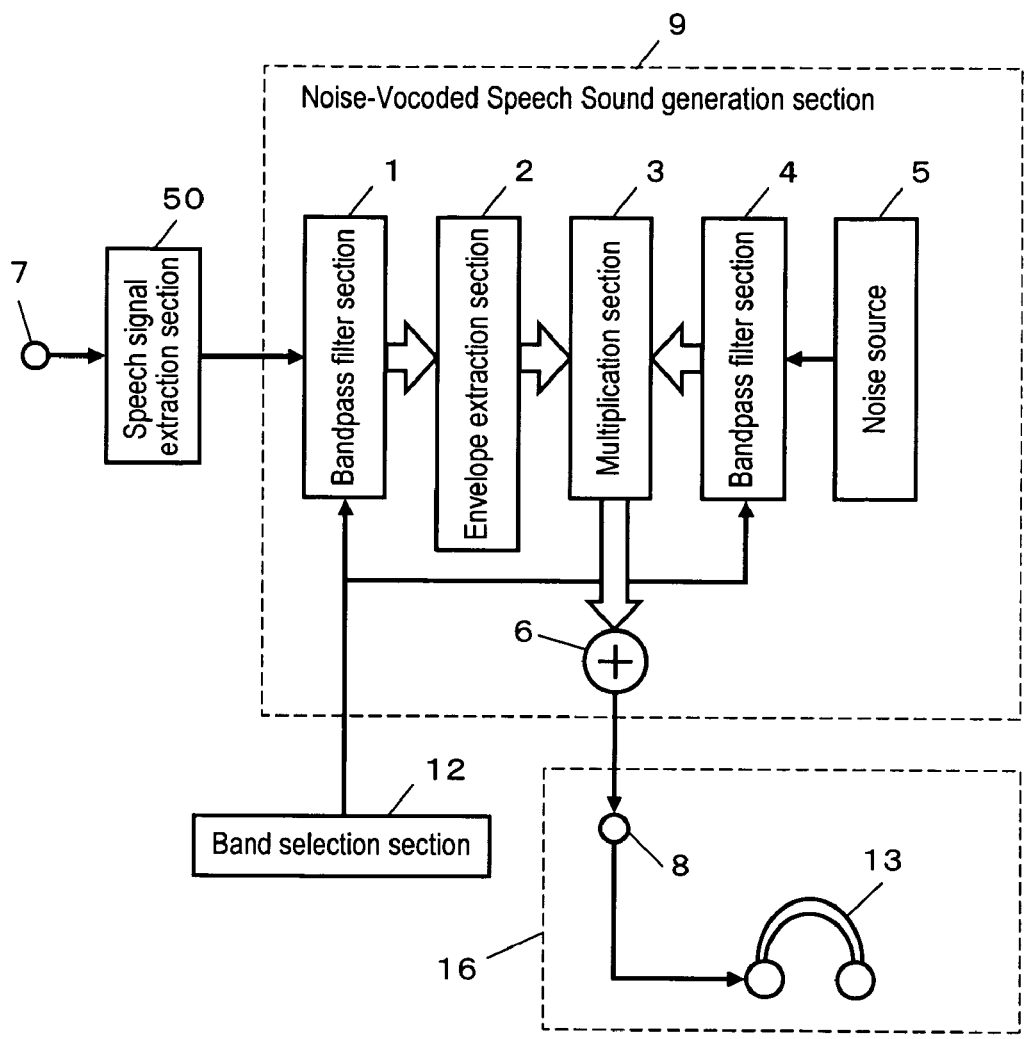
FIG. 10 is a block diagram of still another foreign language learning apparatus according to an embodiment of the present invention.

In the foreign language learning apparatus of FIG. 1, an input speech signal from the microphone is applied to the bandpass filter section 1 through the input terminal 7. However, ambient noise components may sometimes be included in the input speech signal along with speech components. A configuration such as the one illustrated in FIG. 10 may be used in such a case. In FIG. 10, an input signal from the microphone applied to the input terminal 7 passes through a speech signal extraction section 50 and is then applied to a Noise-Vocoded Speech Sound generation section 9. The speech signal extraction section 50 has the capability to extract a speech signal from an input speech signal comprising ambient noise etc. To this end, a configuration is used, in which noise components concomitant with the speech signal, which are contained in the input speech signal, are compressed using a technique such as spectral subtraction.

Embodiment 7

In the foreign language learning apparatus of FIG. 3 and the foreign language learning apparatus of FIG. 5, when ambient noise concomitant with speech components is contained in the speech signal of the speech source signal sections 10 and 20, the signal may be applied to the Noise-Vocoded Speech Sound generation sections 9 and 21 through the speech signal extraction section 50 described in FIG. 10. Moreover, in a game-like foreign language learning apparatus or a game device, in which one of two people inputs words and sentences through the microphone and another listens to Noise-Vocoded Speech Sound, trying to guess the original words and sentences, ambient noise may be mixed in, and therefore it is desirable to provide a speech signal extraction section 50.

Embodiment 8

Figure 11:
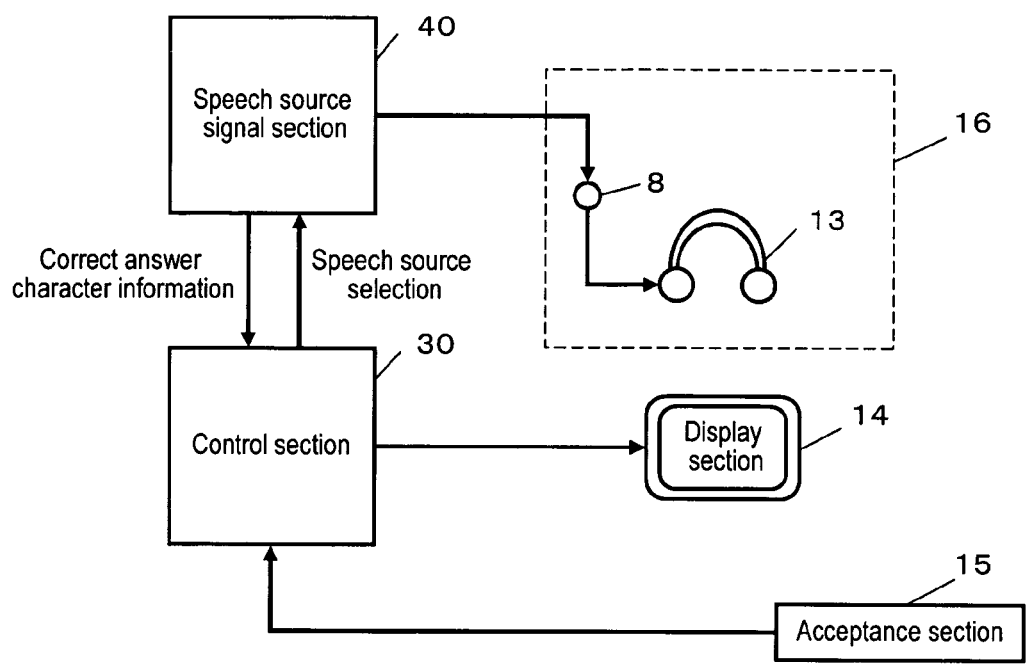
FIG. 11 is a block diagram of yet another foreign language learning apparatus according to an embodiment of the present invention.

FIG. 11 illustrates a foreign language learning apparatus, in which a Noise-Vocoded Speech Sound signal obtained by converting a speech signal into Noise-Vocoded Speech Sound is stored in a speech source signal section 40 in advance as a speech source, and this Noise-Vocoded Speech Sound signal is then supplied to an output section 16 and presented to the learner for listening through headphones 13. In this embodiment, the Noise-Vocoded Speech Sound generation sections 9 and 21 of FIG. 3 and FIG. 5 may be eliminated. The control section 30 may be similar to the embodiment of FIG. 5.

Moreover, speech source 1, speech source 2, and speech source 3 providing Noise-Vocoded Speech Sound signals, as well as correct answer character information for a correct answer 1, correct answer 2, and correct answer 3, paired with the speech sources, may be stored in the speech source signal section 40. The correct answer character information corresponds to a plurality of tasks constituting each speech source and is made up of correct answer character information for each task. In such a case, when the speech source selection means 33 of the control section 30 selects any of the speech source 1, speech source 2, or speech source 3, the correct answer character information paired with the selected speech source can be extracted from the speech source signal section 40 by the speech source selection means 33 and passed on to the response evaluation control means 31 of the control section 30.

The speech source signal section 40 may be constituted by recording media and a recording medium readout device, such as CD-ROM recording media and a CD-ROM drive units, and the speech source selection means 33 of the control section 30 may instruct a recording/reading device to read a predetermined speech source with Noise-Vocoded Speech Sound signals and correct answer character information, output the Noise-Vocoded Speech Sound signal to the output section 16, and pass the correct answer character information on to the response evaluation control means 31. The recording media and recording medium reading device may be constituted by storage media such as a memory card with built-in nonvolatile semiconductor memory and a reading device for storage media. The speech source 1, speech source 2, and speech source 3 providing Noise-Vocoded Speech Sound signals, as well as correct answer character information for the correct answer 1, correct answer 2, and correct answer 3, which are respectively paired therewith, may be recorded or stored on the CD-ROM recording media and the memory card. A software program comprising the processing procedure of the control section 30 described in Embodiment 4 and Embodiment 5 may also be recorded or stored on the CD-ROM recording media and the memory card.

Embodiment 9

Game devices used for learning various foreign languages can be implemented based on the configuration of FIG. 5 above. At first, a game title and difficulty selection screen are displayed, after which the players select the level of difficulty in the acceptance section 15, and the control section 30 presents Noise-Vocoded Speech Sound made up of words and sentences of the selected level of difficulty. A record of correct response percentages, the number of correct responses, etc. are displayed on the display section 14 while the game is being played. When a high score is obtained, an entertaining screen may be displayed on the section 14 as a reward for the enjoyment of the players. A contest may be held to answer as many tasks as possible, and as correctly as possible, within a certain time. For such a game, a game device may be designed for students in the initial stages of foreign language learning as well as for advanced learners. The presented contents, the speed of presentation, and the presentation screens can be appropriately modified depending on the target audience. The desire to get a high score is expected to further stimulate brain activity.

The players may select the level of difficulty of the game by operating the acceptance section 15. For instance, they would select the number of the bandpass filters from 1 to 4 filters. Because in case of four filters the original words and sentences are distinguished more easily than in case of one filter, the players can select the difficulty level of the game.

Embodiment 10

Figure 12A:
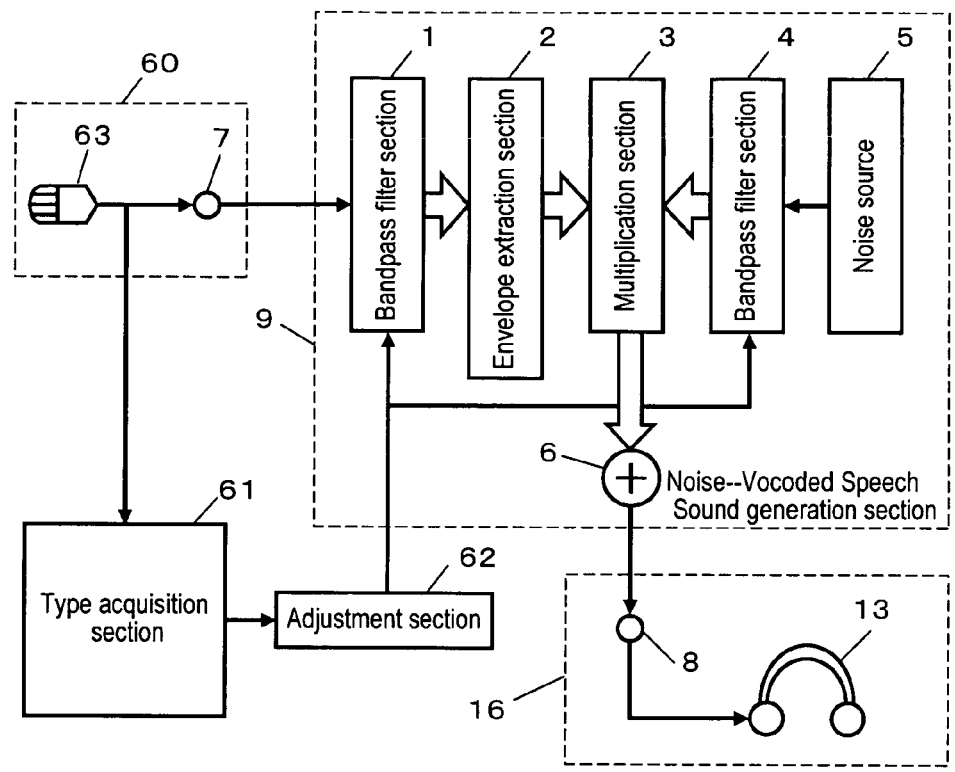
FIGS. 12A and 12B are block diagrams of yet another foreign language learning apparatus according to an embodiment of the present invention.
Figure 12B:
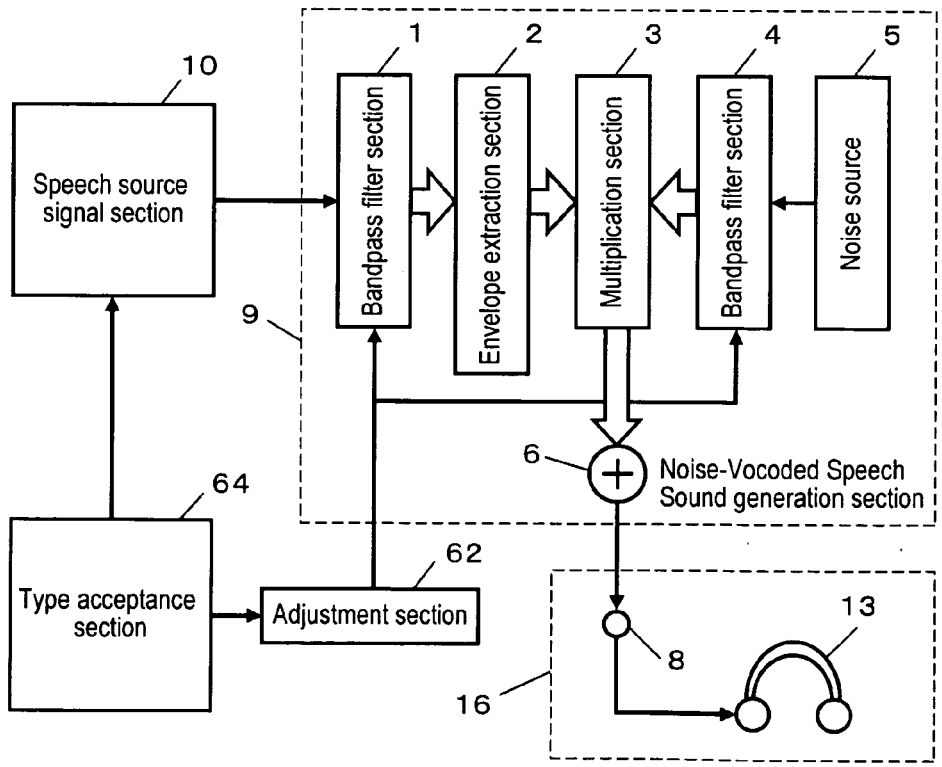

Next, FIGS. 12A and 12B are used to provide more detailed explanations regarding the configuration briefly described in Embodiment 2, in which adjustments are made to the band boundary frequencies depending on the foreign language.

In FIG. 12A, a speech source signal section 60 is made up of a microphone 63 and an input terminal 7. The output signal of the microphone 63 is supplied to a Noise-Vocoded Speech Sound generation section 9 through the input terminal 7 as a speech signal converted into digital speech signal information by an analog-to-digital conversion circuit, not shown. In addition, the speech signal, in digital form, is also supplied to a type acquisition section 63. The type acquisition section 63 has well-known automatic language recognition means built in. The automatic language recognition means possesses the capability to analyze the digital speech signal information, determine the foreign language, and generate foreign language type information corresponding to the foreign language, and is typically implemented on the basis of a computer system. The term "foreign language type information" refers to information used for foreign language identification, specifically for Japanese, English, Chinese, French, German, etc. The type acquisition section 63 accepts digital speech signal information, generates foreign language type information based on the accepted digital speech signal information, and supplies the foreign language type information to an adjustment section 62. The adjustment section 62 sets the number of bandpass filters and the frequency band boundaries corresponding to the language in question in the bandpass filter sections 1 and 4 in accordance with the foreign language type information. Although the adjustment section 62 can be implemented in the same manner as the band selection section 12, it may also be configured to have built-in parameters for setting frequency band boundaries and the number of bandpass filters for each language and to select the parameters in accordance with the foreign language type information. In other words, the adjustment section 62 stores a correspondence table of band boundary frequencies and/or number of bands by foreign language and, in accordance with the foreign language type information supplied from the type acquisition section 63, reads information on the band boundary frequencies and/or number of bands from the correspondence table and supplies it to the Noise-Vocoded Speech Sound generation section 9.

FIG. 12B illustrates a working example in which, instead of the automatic language recognition device, frequency band boundaries and the number of bandpass filters for a particular foreign language are set in the bandpass filter sections 1 and 4 of the Noise-Vocoded Speech Sound generation sections 9 with the help of an input device such as a keyboard, a mouse, etc. An input device, such as a mouse, a keyboard, or a switch, etc. can be used for the type acceptance section 64, which is an input means provided for inputting foreign language type information by instructors or learners. Foreign language type information accepted by the type acceptance section 64 is supplied to the adjustment section 62. The adjustment section 62 stores a correspondence table of band boundary frequencies and/or number of bands classified by foreign language and, in accordance with the foreign language type information supplied from the type acquisition section 63, reads information regarding the band boundary frequencies and/or number of bands and supplies it to the Noise-Vocoded Speech Sound generation section 9. Foreign language type information accepted by the type acceptance section 64 is supplied to the speech source signal section 10 as well. Speech source signals corresponding to a plurality of foreign languages are stored in the speech source signal section 10, with the speech source signal section 10 selecting the corresponding foreign language speech signals based on the supplied foreign language type information and supplying them to the Noise-Vocoded Speech Sound generation section 9.

By doing so, the frequency band boundaries and the number of bandpass filters suitable for the foreign language in question can be set in the Noise-Vocoded Speech Sound generation section 9 and an appropriate Noise-Vocoded Speech Sound signal can be generated and outputted to the output section 16.

It should be noted that the configuration of the Noise-Vocoded Speech Sound generation section 21 may be used instead of the Noise-Vocoded Speech Sound generation section 9. In such a case, a band setup means 22 is provided in the Noise-Vocoded Speech Sound generation section 21 and the adjustment section 62 can be configured in the same manner as the band selection means 34, such that parameters for setting the number of bandpass filters and the frequency band boundaries for each of the languages are built-in internally, with these parameters selected based on the foreign language type information and supplied to the band setup means 22. In other words, the adjustment section 62 stores a correspondence table of band boundary frequencies and/or number of bands by foreign language and, in accordance with the foreign language type information supplied from the type acquisition section 63, reads information on the band boundary frequencies and/or number of bands from the correspondence table and supplies it to the band setup means 22.

Also, needless to say, this embodiment may be combined with the configuration explained in FIG. 5 through FIG. 9, which involves supplying a speech signal, whose level of difficulty is changed in accordance with the response results, or adjusting the band boundary frequencies and/or number of bands based on the response results.

Other Embodiments and Additions

The speech signals stored in the speech source signal sections 10 and 20 are preferably stored in the form of digital sample data obtained from speech signal waveforms, which can be in analog or compressed data form, but are not limited to these forms. The output format of the Noise-Vocoded Speech Sound signal in the output terminal 8 of the output section 16 may be in the form of digital sample data, analog signal waveforms, etc. and, needless to say, when it is in the form of digital sample data, it is supplied to the headphones 13 after conversion to an analog signal waveform. Ultimately, the Noise-Vocoded Speech Sound signal is converted into sound audible to the learner.

Although in each of the embodiments described above, the number of the bandpass filters of the bandpass filter sections 1 and 4 in the Noise-Vocoded Speech Sound generation sections 9 and 21 was typically set to four, this number is not limited to four and may be less than four or greater than four, with the appropriate number of bands determined as the occasion demands. Moreover, the method of changing the band boundary frequencies and the number of frequency bands is not limited to the method based on the use of the Noise-Vocoded Speech Sound generation section 21 illustrated in FIG. 6. For instance, a configuration may be used, in which the ratio of the noise-vocoded components and the original speech signal components is changed by changing the highpass and low-pass cutoff characteristics of the bandpass filters. In the Noise-Vocoded Speech Sound generation section 21, the ratio of the energies of the original speech signal components and noise components in the Noise-Vocoded Speech Sound signal, as well as the frequency distribution of the energy ratio, etc., may be modifiable. Instead of the switch SWa, an adder is provided that weights the output signals of the multiplier 3a and bandpass filter 1a such that the energy ratio of the original speech signal components and noise components can be adjusted if the weight information is adjusted based on the correct response percentage CI. If the switches SWb, SWc, and SWd are also replaced with similar adders and the weight information for each adder set differently, the energy ratio of the original speech signal components and noise components for each band can be adjusted at will.

Although in Embodiments 4 and 5 above the correct response percentage CI was calculated for ten tasks constituting an exercise, needless to say, the correct response percentage, i.e. whether the answer is right or wrong, can be determined for every single task, with the next task selected based on the results.

Moreover, for input in the acceptance section 15, the learner may use the writing system of the foreign language in question or the writing system of the mother tongue. The correct answer character information stored in the correct answer storage means 32 may be represented by character information in the foreign language in question and/or by character information in the mother tongue.

The learner may respond by selecting a response number. To this end, for each task of the exercise, character information and response numbers of a plurality, e.g. five, responses may be stored in the correct answer storage means 32 as correct answer character information and the response evaluation control means 31 may display it on the display section 14 via the display control means 36, so that the respondent may choose a response number by looking at the display and input it in the acceptance section 15 or, alternatively, use a mouse to select the characters of a response number on the display section 14 and input it in the input analysis means 35.

In each of the embodiments above, the original speech signal may be presented to the learner before outputting the Noise-Vocoded Speech Sound signal. The Noise-Vocoded Speech Sound signals and the original speech signals may also be outputted in an alternating fashion. To do so, there may be provided a path for supplying the output signals of the speech source signal sections 10 and 20 to the headphones 13 by circumventing the Noise-Vocoded Speech Sound generation section 21.

The inventive software program for -foreign language learning is a software program for running the processing procedures of the foreign language learning apparatus described in the embodiments above on a computer, and there can be more than one such program. Namely, it is a software program for foreign language learning comprising a step of outputting a Noise-Vocoded Speech Sound signal produced by dividing at least a portion of a speech signal in a foreign language into frequency band signals and subjecting them to noise degradation, e.g. (Step S100), which is the first step, or the noise vocoding procedure.

Alternatively, it is a software program for foreign language learning comprising a step wherein a learner's response results are accepted, e.g. (Step S32), a step wherein the difficulty of aural perception is adjusted by adjusting one of the utterances constituting the foreign language speech signal, the speed of production of the speech signal, or the pitch frequency in accordance with the response results, and a step wherein a Noise-Vocoded Speech Sound signal, which is obtained by dividing at least a portion of the modified speech signal into a plurality of frequency band signals and subjecting part or all of the plurality of frequency band signals to noise degradation, is outputted, e.g. (Step S100) and (Step S31).

Alternatively, it is a software program for foreign language learning comprising a step, wherein a learner's response results are accepted, e.g. (Step S32), a step wherein one speech signal is selected from two or more signals in a foreign language in accordance with the response results, e.g. (Step S30), and a step wherein a Noise-Vocoded Speech Sound signal, produced by dividing at least a portion of the selected speech signal into a plurality of frequency band signals and subjecting part or all of the frequency band signals among the plurality of frequency band signals to noise degradation, is outputted, e.g. (Step S100) and (Step S31).

Alternatively, it is a software program for foreign language learning comprising a step wherein a Noise-Vocoded Speech Sound signal, produced by dividing at least a portion of a speech signal in a foreign language into a plurality of frequency band signals and subjecting part or all of the frequency band signals among the plurality of frequency band signals to noise degradation, is outputted, e.g. (Step S100) and (Step S31), a step wherein a learner's response results are accepted, e.g. (Step S32), and a step wherein band boundary frequencies and/or the number of frequency bands in the Noise-Vocoded Speech Sound generation section are adjusted in accordance with the response results, e.g. (Step S40).

It should be noted that the term "recording media", on which the software program documenting the procedure of the foreign language learning method of the present invention is recorded, refers to recording media such as ROM, RAM, flexible disks, CD-ROMs, DVDs, memory cards, hard disks, etc., on which the software program is recorded. In addition, this concept also includes phone lines, transmission channels, and other communication media. In other words, when processing in the present embodiment is implemented based on software, the software may be distributed via download etc.

Additionally, the recording media used for recording the speech signals or Noise-Vocoded Speech Sound signals stored by the speech source signal sections 10, 20, and 40, as well as the speech signals or Noise-Vocoded Speech Sound signals stored by the speech source signal sections 20 and 40, or alternatively, correct answer character information for exercises and tasks, are recording media such as ROM, RAM, flexible disks, CD-ROMs, DVDs, memory cards, hard disks, etc., on which the software program is recorded. Moreover, speech signals or Noise-Vocoded Speech Sound signals stored by the speech source signal sections 10, 20, and 40, speech signals or Noise-Vocoded Speech Sound signals stored by the speech source signal sections 20 and 40, or alternatively, correct answer character information for exercises and tasks, may be distributed via software download etc. as educational software etc.

The foreign language speech signals or Noise-Vocoded Speech Sound signals may be put together as a plurality of tasks or a plurality of exercises and stored on a remote server, from which the data of the foreign language speech signals or Noise-Vocoded Speech Sound signals may be downloaded through communication means, stored in the speech source signal sections 10, 20, and 40, and then read out in the same manner as in the embodiments above. Moreover, when only one task based on foreign language speech signals or Noise-Vocoded Speech Sound signals is learned at a time, a single task may be downloaded and used and the next task may be downloaded when learning ends. Correct answer information is preferably also stored on the server and downloaded along with the exercises and tasks. In this case, the learner's response results may be transmitted by communication means from the control section 30 to a remote server device storing foreign language speech signals or Noise-Vocoded Speech Sound signals, with the server selecting the next exercise. The speech source signal section 20 may be provided in a remote server device and the Noise-Vocoded Speech Sound generation section 21, control section 30 and output section 16 may be installed on a personal information manager PDA, a mobile phone, a home PC, an electrical household appliance, etc., with the Noise-Vocoded Speech Sound generation section 21, control section 30, and the server linked by communication means. The speech source signal section 20 and the Noise-Vocoded Speech Sound generation section 21 may be provided in a remote server device, and the control section 30 and output section 16 may be installed on a personal information manager PDA, a mobile phone, a home PC, an electrical household appliance, etc., with the control section 30, output section 16, and the server linked by communication means. The speech source signal section 40 may be provided in a remote server device, and the control section 30 and output section 16 may be installed on a personal information manager PDA, a mobile phone, a home PC, an electrical household appliance, etc., with the control section 30, output section 16, and the server linked by communication means.

Moreover, the speech source signal section 20 and the Noise-Vocoded Speech Sound generation section 21, or the speech source signal section 40 and the control section 30, may be provided on a remote server device, and the output section 16, such as a display section 14, an acceptances section 15, or headphones 13, may be installed on a terminal device such as a personnel information manager PDA, a mobile phone, a home PC, or an electrical household appliance, such that the server device may output Noise-Vocoded Speech Sound signals and correct answer information corresponding to the Noise-Vocoded Speech Sound signals in question to the terminal device through a telecommunication line. The correct answer information may be displayed on the display section 14 of the terminal device and the response results accepted by the acceptance section 15 may be sent to the control section 30 of the server device through a telecommunication line. It should be noted that the display control means 36 and input analysis means 35 of the control section 30 may be provided in the terminal device.

Also, needless to say, when it is used in download form described above, a transceiver circuit used for connecting to the telecommunication line may be installed in the server device and the terminal device.

The inventive foreign language learning apparatus, the foreign language learning method, and the recording medium and software program for foreign language learning can be used in a foreign language school or an ordinary household.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application No. 2005-197209 filed Jul. 6, 2005 including specification, drawings and claims is incorporated herein by reference in its entirety.

What is claimed is:

1. A foreign language learning method comprising steps of:
extracting each of prescribed frequency band signals from a speech signal in a foreign language using a plurality of first bandpass filters of a first bandpass filter section;
extracting each of envelopes of the prescribed frequency band signals using each of envelope extractors of an envelope extraction section;
applying a noise source signal to a plurality of second bandpass filters of a second bandpass filter section;
extracting noise signals corresponding to the plurality of prescribed frequency band signals;
multiplying each of outputs from the envelope extraction section and each of outputs from the second bandpass filter section in a multiplication section;
summing up the outputs from the multiplication section in an addition section to form the Noise-Vocoded Speech Sound signal;
outputting the Noise-Vocoded Speech Sound signal such that the Noise-Vocoded Speech Sound signal activates brain regions other than typically used brain regions for speech perception and production in a mother tongue;
accepting a learner's response results; and
selecting one speech signal from two or more speech signals in the foreign language in accordance with the response results;
wherein the selected speech signal is used as the speech signal in the first bandpass filter section.

2. A foreign language learning method comprising steps of:
extracting each of prescribed frequency band signals from a speech signal in a foreign language using a plurality of first bandpass filters of a first bandpass filter section;
extracting each of envelopes of the prescribed frequency band signals using each of envelope extractors of an envelope extraction section;
applying a noise source signal to a plurality of second bandpass filters of a second bandpass filter section;

extracting noise signals corresponding to the plurality of prescribed frequency band signals;
multiplying each of outputs from the envelope extraction section and each of outputs from the second bandpass filter section in a multiplication section;
summing up the outputs from the multiplication section in an addition section to form the Noise-Vocoded Speech Sound signal;
outputting the Noise-Vocoded Speech Sound signal such that the Noise-Vocoded Speech Sound signal activates brain regions other than typically used brain regions for speech perception and production in a mother tongue;
accepting a learner's response results; and
adjusting any of the utterances constituting the speech signal in the foreign language, the speed of production of the speech signal, and its pitch frequency in accordance with the response results;
wherein the adjusted speech signal is used as the speech signal in the first bandpass filter section.

3. A foreign language learning method comprising steps of:
extracting each of prescribed frequency band signals from a speech signal in a foreign language using a plurality of first bandpass filters of a first bandpass filter section;
extracting each of envelopes of the prescribed frequency band signals using each of envelope extractors of an envelope extraction section;
applying a noise source signal to a plurality of second bandpass filters of a second bandpass filter section;
extracting noise signals corresponding to the plurality of prescribed frequency band signals;
multiplying each of outputs from the envelope extraction section and each of outputs from the second bandpass filter section in a multiplication section;
summing up the outputs from the multiplication section in an addition section to form the Noise-Vocoded Speech Sound signal;
outputting the Noise-Vocoded Speech Sound signal such that the Noise-Vocoded Speech Sound signal activates brain regions other than typically used brain regions for speech perception and production in a mother tongue;
accepting a learner's response results; and
adjusting at least one of the prescribed frequency of the first and second bandpass filters and the number of the first and second bandpass filters in accordance with the response results.

4. A foreign language learning method comprising steps of:
extracting each of prescribed frequency band signals from a speech signal in a foreign language using a plurality of first bandpass filters of a first bandpass filter section;
extracting each of envelopes of the prescribed frequency band signals using each of envelope extractors of an envelope extraction section;
applying a noise source signal to a plurality of second bandpass filters of a second bandpass filter section;
extracting noise signals corresponding to the plurality of prescribed frequency band signals;
multiplying each of outputs from the envelope extraction section and each of outputs from the second bandpass filter section in a multiplication section;
summing up the outputs from the multiplication section in an addition section to form the Noise-Vocoded Speech Sound signal;
outputting the Noise-Vocoded Speech Sound signal such that the Noise-Vocoded Speech Sound signal activates brain regions other than typically used brain regions for speech perception and production in a mother tongue;
accepting a learner's response results;
comparing correct answer information and the response results, calculating a correct response percentage, and comparing the correct response percentage with a predetermined threshold value; and
adjusting at least one of the prescribed frequency of the first and second bandpass filters and the number of the first and second bandpass filters to render the outputted Noise-Vocoded Speech Sound signals practically identical to the speech signals in the foreign language when the correct response percentage is greater than the predetermined threshold value.

5. A foreign language learning apparatus comprising:
a Noise-Vocoded Speech Sound generation section having speech signal bandpass filters, envelope extractors, noise signal bandpass filters, and multipliers,
wherein a first one of the speech signal bandpass filters is configured to divide a speech signal into a first band speech signal, said first band speech signal being in a first frequency band,
wherein a first one of the envelope extractors is configured to extract a first envelope signal from said first band speech signal, said first envelope signal being an envelope of the first band speech signal,
wherein a first one of the noise signal bandpass filters is configured to divide a noise signal into a first band noise signal, said first band noise signal being in said first frequency band,
wherein a first one of the multipliers is configured to produce a first multiplied result, said first band noise signal and said first envelope signal multiplied together being said first multiplied result,
wherein said Noise-Vocoded Speech Sound generation section has switches, a first one of the switched being configured to select said first band speech signal or said first multiplied result.

6. A foreign language learning apparatus comprising:
a Noise-Vocoded Speech Sound generation section having speech signal bandpass filters, envelope extractors, noise signal bandpass filters, and multipliers;
a speech source signal section configured to store a plurality of speech signals, said speech signal being one of the speech signals,
wherein a first one of the speech signal bandpass filters is configured to divide a speech signal into a first band speech signal, said first band speech signal being in a first frequency band,
wherein a first one of the envelope extractors is configured to extract a first envelope signal from said first band speech signal, said first envelope signal being an envelope of the first band speech signal,
wherein a first one of the noise signal bandpass filters is configured to divide a noise signal into a first band noise signal, said first band noise signal being in said first frequency band,
wherein a first one of the multipliers is configured to produce a first multiplied result, said first band noise signal and said first envelope signal multiplied together being said first multiplied result.

7. The foreign language learning apparatus according to claim 6, further comprising:
an acceptance section configured to accept response results, said response results being from a learner;
a control section configured to select said speech signal from said plurality of speech signals, said speech signal being selected in accordance with said response results.

8. The foreign language learning apparatus according to claim 7, wherein said control section causes said speech source signal section to perform an adjustment, said adjustment being an from the group consisting of adjusting any utterance constituting said speech signal, adjusting a speed of production of said speech signal, adjusting a pitch frequency of said speech signal in accordance with said response results.

9. The foreign language learning apparatus according to claim 7, wherein said control section adjusts the band boundary frequencies of the Noise-Vocoded Speech Sound signals generated by said Noise-Vocoded Speech Sound generation section.

10. The foreign language learning apparatus according to claim 7, wherein said control section adjusts the number of bands of Noise-Vocoded Speech Sound signals generated by said Noise-Vocoded Speech Sound generation section, said number of bands being adjusted in accordance with said response results.

11. The foreign language learning apparatus according to claim 7, wherein said control section further comprises:
 a correct answer storage means that has stored correct answer information, which is information describing correct answers corresponding to said speech signal;
 a response evaluation control means for comparing said correct answer information and said response results, calculating a correct response percentage, and comparing said correct response percentage with a predetermined threshold value.

12. The foreign language learning apparatus according to claim 11, wherein said control section causes an adjustment of a band boundary frequency of said first speech signal bandpass filter when said correct response percentage is greater than the predetermined threshold value.

13. The foreign language learning apparatus according to claim 5, wherein said first multiplied result and a second multiplied result are added together, a second band noise signal and a second envelope signal multiplied together being said second multiplied result.

14. The foreign language learning apparatus according to claim 13, wherein a second one of the multipliers is configured to produce said second multiplied result.

15. The foreign language learning apparatus according to claim 13, wherein a second one of the speech signal bandpass filters is configured to divide said speech signal into said second band speech signal, said second band speech signal being in a second frequency band.

16. The foreign language learning apparatus according to claim 15, wherein a second one of the envelope extractors is configured to extract a second envelope signal from said second band speech signal, said second envelope signal being an envelope of the second band speech signal.

17. The foreign language learning apparatus according to claim 15, wherein a second one of the noise signal bandpass filters is configured to divide said noise signal into said second band noise signal, said second band noise signal being in said second frequency band.

* * * * *